US005652834A

United States Patent [19]
Jansson

[11] Patent Number: 5,652,834
[45] Date of Patent: Jul. 29, 1997

[54] METHOD OF AVOIDING NON-DESIRED INTERFERENCE BETWEEN SERVICES BY CREATING A TRUNCATED BINOMIAL TREE WHICH REPRESENT ACTIVE OR PASSIVE ACTION ELEMENTS

[75] Inventor: Rickard Jansson, Stockholm, Sweden

[73] Assignee: Telefonaktiebolaget LM Ericsson, Stockholm, Sweden

[21] Appl. No.: 258,583

[22] Filed: Jun. 10, 1994

[30] Foreign Application Priority Data

Jun. 11, 1993 [SE] Sweden .................................. 9302024

[51] Int. Cl.$^6$ ...................................................... G06F 13/14
[52] U.S. Cl. ........................ 395/183.13; 395/849; 379/10; 379/34; 379/145; 379/272
[58] Field of Search .............................. 364/422, 724.03; 379/410, 10, 34, 145, 272; 395/700, 183.13, 375, 650, 849

[56] References Cited

U.S. PATENT DOCUMENTS

| | | | |
|---|---|---|---|
| 3,976,863 | 8/1976 | Engel | 364/724.03 |
| 4,688,245 | 8/1987 | Schenk | 379/410 |
| 4,782,444 | 11/1988 | Munshi et al. | 395/700 |
| 4,942,528 | 7/1990 | Kerzner | 364/422 |

OTHER PUBLICATIONS

D. J. Aitken, "Experiences of Implementation Using Advanced Intelligent Network Release 1 Architecture," Eight Int'l Conf. on Software Engineering for Telecommunication Systems and Services, pp. 19–26 (1992).

E. J. Cameron et al., "A Real–Time Transition Model for Analyzing Behavioral Compatibility of Telecommunications Services," SIGSOFT Software Engineering Notes, vol. 16, No. 5, pp. 101–111 (Dec. 1991).

E. J. Cameron et al., "A Feature–Interaction Benchmark for IN and Beyond," IEEE Communication Magazine, vol. 31, No. 3, pp. 64–69 (Mar. 1993).

L. Schessel, "Administrable Feature Interaction Concept," Int'l Switching Symposium, Proceedings, vol. 2, pp. 122–126 (1992).

Primary Examiner—Thomas C. Lee
Assistant Examiner—Po C. Huang
Attorney, Agent, or Firm—Burns, Doane, Swecker & Mathis, L.L.P.

[57] ABSTRACT

A method of avoiding undesirable interferences between services in a telecommunications system that includes basic software for a basic service and supplemental software for services supplemental to the basic service. The supplemental software is divided into action software which acts solely on the basic service, and supplemental software which acts on the remaining supplemental software. A supplemental service is represented by action elements. Combinations of action elements form nodes in a mathematical binomial tree. Only those combinations which correspond to interference, i.e., an undesirable behaviour, between supplemental services will form a number of structures, called interference event trees. Before a supplemental service can be executed, its action elements are compared with nodes in the interference event trees (55), with the intention of ascertaining whether or not the former coincide with action elements belonging to the nodes in the latter. Only those interference event nodes whose sets of action elements are equivalent with the set of action elements of the supplemental service or a set thereof are selected. An interference event node whose set of action elements is a subset of the action elements of a node that has already been chosen cannot be selected. Interaction software belonging to selected nodes in the interference event trees is added to the basic software.

13 Claims, 11 Drawing Sheets

Fig. 32
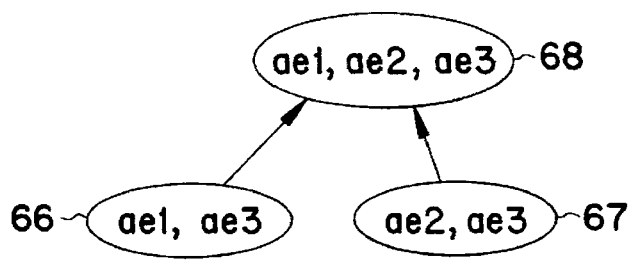
Fig. 33
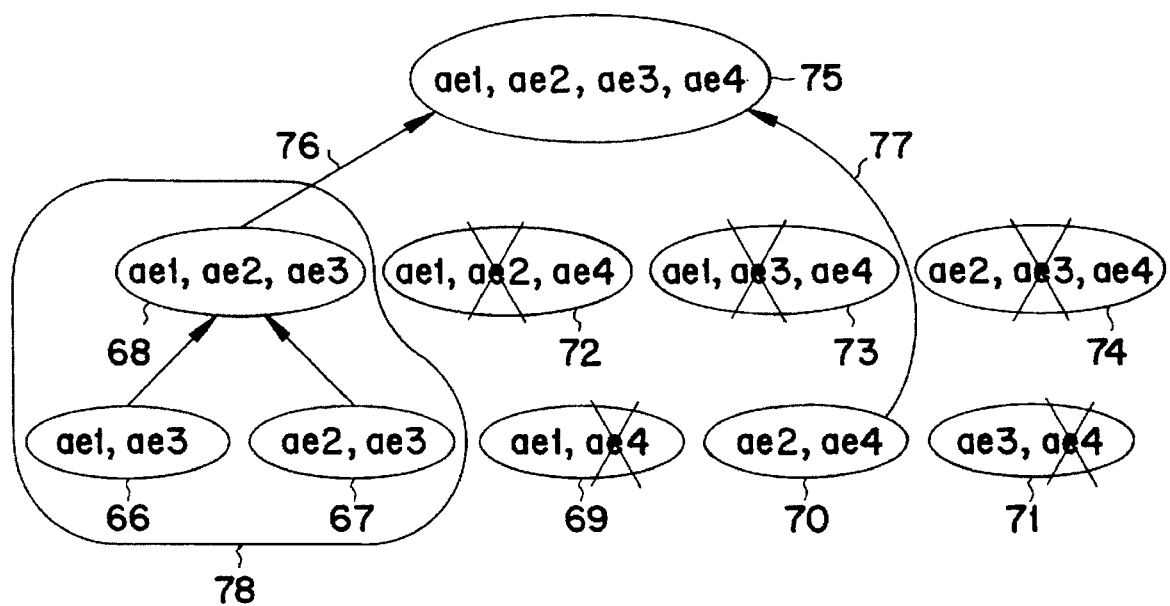
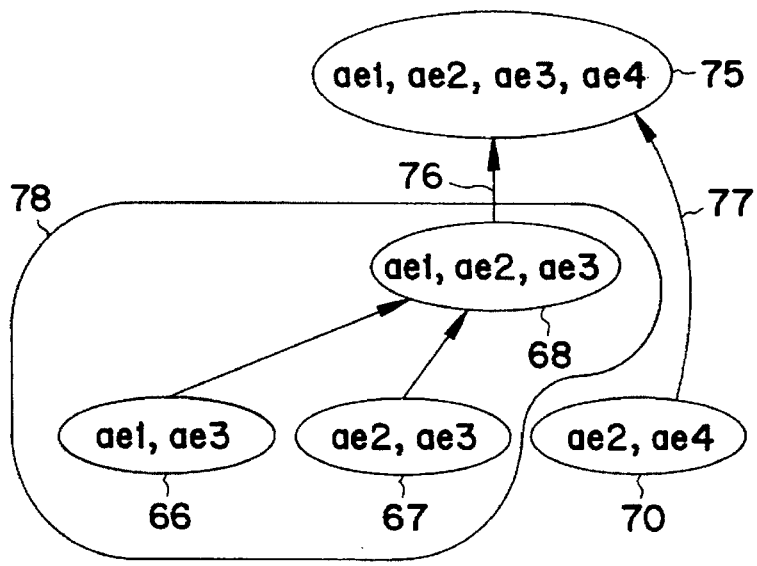
Fig. 34

METHOD OF AVOIDING NON-DESIRED INTERFERENCE BETWEEN SERVICES BY CREATING A TRUNCATED BINOMIAL TREE WHICH REPRESENT ACTIVE OR PASSIVE ACTION ELEMENTS

TECHNICAL FIELD

The present invention relates to a method of avoiding undesirable behaviour, called interference, between services in a telecommunications system which includes basic software for a basic service and supplemental software for services supplemental to the basic service, wherein the supplemental software is divided into action software which acts only towards the basic service and interaction software which acts towards the remainder of the supplemental software. Two or more services which, when active simultaneously, would execute measures which are in conflict with one another, are allocated an interaction function which resolves the conflict. According to the invention, the supplementary service software (even for interfering services) is modular, by which is meant that the addition of new services to the telecommunications system can be made without needing to change existing software; the existing software need only be extended with the new supplemental software. It is also possible to remove one or more existing services, without affecting the software for the basic services or for any other service.

DESCRIPTION OF THE KNOWN PRIOR ART

One very important present-day requirement is that new services can be introduced into the telephone network quickly and at reasonable cost. One main problem with the addition of new services is that many services have properties which are not compatible with other telecommunications services. There would be no problem in introducing a new service, if only one service was activated at a time in the system when executing a process, for instance when setting up a connection. A user, however, will normally have a number of services activated at one and the same time. In present-day systems, some telephone operators offer more than 70 different services and a user may have a large number of these services activated at one and the same time. This means that the services cannot be realized in their "pure" form, and that it is necessary to include in the telecommunications system software which resolves any interference that may occur when two or more services are activated simultaneously.

Interference resolving software is produced traditionally by placing software patches at a number of the locations in the software that controls the processes of the telecommunications system. This is referred to as "patching" the system. When subsequently introducing a new service into the telecommunications system, it is often necessary to change part of the applied program patches and to place new program patches at appropriate locations. No general methods of using patching are known to the art. Patching tends to be more expensive the more the software mass is expanded.

In the construction stage of the AXE 10 telephone system sold by the Swedish company Ericsson, the designers of the AXE 10 system prepared each telephone station for the introduction of predetermined types of subfunctions which the designers judged at that time to be necessary in the future. This preparation consisted in the construction of separate interfaces which allow predetermined types of futuristic subfunctions to be added to the system. An endeavour is made to make these known interfaces prepared for the addition of predetermined types of subfunctions as general as possible within the framework of the type of subfunction concerned.

However, it is difficult at the construction stage of a system to anticipate all conceivable types of subfunctions that may be required in the future but which did not exist at that time.

In the patois used in the telecommunications field, this problem concerning interference between services is referred to as feature interaction. The following example taken from the telephony field illustrates a typical case concerning the setup of a connection between two different numbers. Two subfunctions are involved in the conflict, namely "call diversion" and "diversion-on-busy".

By call diversion is meant that a call made on the ordinary telephone number of a subscriber is redirected to another number specified by the subscriber. The service diversion-on-busy means that if the subscriber to which a call is directed is occupied with another telephone call, the incoming call will be diverted to another, specified telephone number. A user can subscribe to one or more subfunctions. The operator of the telephone network connects corresponding subfunctions to the subscriber. The subscriber can then activate those subfunctions to which he subscribes, for instance by dialling on his telephone dial a digit/character combination which is unique for each subfunction to be activated. Assume that a subscriber, referred to as B below, has the home telephone number 123456 and that the subscriber has the subfunctions "diversion" and "diversion-on-busy" activated. When the subscriber B moves into his/her weekend cottage, for instance, he/she may wish all telephone calls directed to his/her home telephone number to be diverted to his/her weekend cottage and accordingly activates the "diversion" subfunction and gives the telephone number to which calls shall be diverted, in this case the telephone number to the weekend cottage, for instance 123789. When the subscriber leaves home in order to go to work, he/she may wish to ensure, for instance, that an expected important call will be accepted even though the home telephone may be engaged.

Subscriber B then activates the subfunction "diversion-on-busy", and gives the telephone number to which the call shall be diverted, in this case subscriber B's work telephone number 232323. Both of the subfunctions "diversion" and "diversion-on-busy" function in the manner desired when they are each activated individually. Assume, however, that the subscriber B has both subfunctions activated at one and the same time. In this case, when an external party calls subscriber B on B's home telephone number and the home telephone is busy, the traffic system is unable to decide whether the call shall be redirected to the subscriber's work place or to the subscriber's weekend cottage.

SUMMARY OF THE INVENTION

The object of the invention is to provide a method of the kind defined in the introduction with which the drawbacks of the known technique are avoided. This object is achieved by means of the method defined in the following Claims.

BRIEF DESCRIPTION OF THE DRAWINGS

The invention will now be described in more detail with reference to the accompanying drawings, in which

FIG. 32 illustrates an interference event tree for an interference capsule which includes three action elements;

FIG. 33 illustrates the interference event tree in FIG. 32 extended with the interference events that possibly occur when adding a fourth action element to the interference capsule in FIG. 32; and FIG. 34 illustrates the interference event tree obtained after analysis of the possible interference events in FIG. 33.

BEST MODES OF CARRYING OUT THE INVENTION

Theoretical Background

Figures 1, 2:
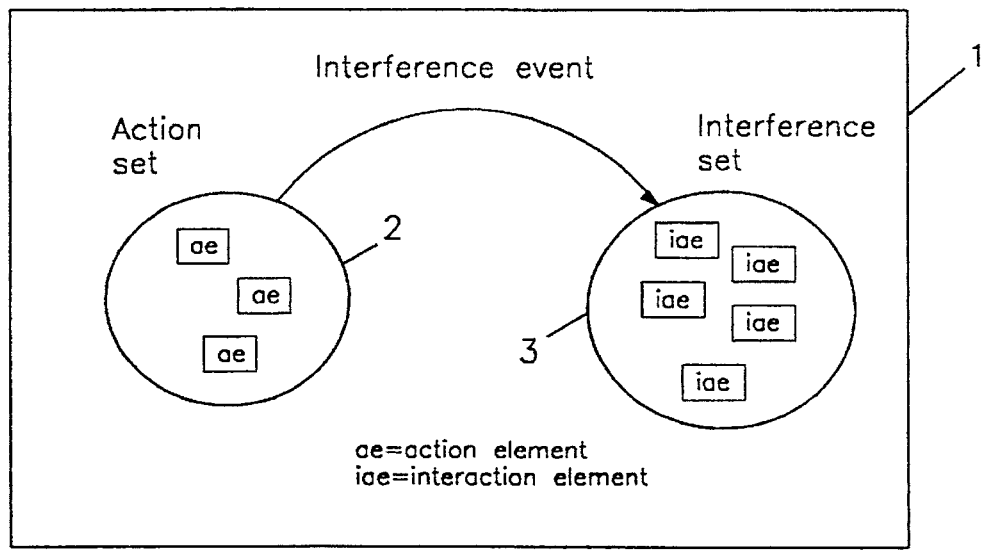
FIG. 1 illustrates an interference event.
FIG. 2 illustrates Pascal's triangle.

Interference is a general term used to identify the phenomena that occurs when two or more phenomenons act simultaneously in the same medium (c.f. wave mechanics). The term interference used in the present description refers to the undesirable phenomena that can occur when two or more functions having mutual dependencies are present in the same process at one and the same time.

Many different types of telecommunications systems exist. Examples of typical telecommunications systems include telephony, broadband services, mobile telephony, personal paging, video text, date1, packet-activated data networks, circuit-activated data networks, local area networks (LAN), and so on.

Different processes are executed in a specific telecommunications system. Processes can be executed in parallel and/or in series. Examples of processes in a telephone system include call setups, call handling, the setup of a route through selectors and switches, etc. By process is meant in the following a state machine which describes the functions of a device in terms of state and external stimulus. There is established in this state machine model a table which describes each combination of state and external stimulus. The table also discloses for each such combination the new state to which the state machine shall switch in response to a relevant external stimulus. Sometimes, a combination of external stimulus and state does not result in a state change. If the known state machine is to be used as a model to describe processes in a system of the kind with which the invention is concerned, it is necessary to supplement the model with those output signals that are delivered by the state machine for each combination of external stimulus and state, among other things. A model of this kind is a simplified model of reality and does not, for instance, describe those procedures which execute the state changes.

It is the intention of the invention to solve problems relating to the fact that telecommunication systems which include different service setups exist in different markets for instance and that there is a need to be able to supplement the telecommunications system with new subfunctions. More specifically, the aforesaid problems are concerned with the ability of adding services to the telecommunications system and removing from the system services that have already been constructed in the system, and to enable completely new services to be constructed in existing telecommunications systems.

A service which can be added to and removed from a telecommunications system is referred to in the following as a supplemental service.

A telecommunications system is often highly complex due to the supplemental services which enable the telecommunications system to be supplemented with new subfunctions that did not earlier exist.

The following definitions are used: An interference capsule is the name given to a process which can be considered as a state machine. It is not the intention of the present invention to define a specific interference capsule in a specific telecommunications application. The present invention is not dependent on the way in which an interference capsule is defined.

It is assumed that the following postulation applies: Interference can exist only within those subsets of the telecommunications system that are defined as interference capsules.

According to the invention, interference is structured in interference events. Those services which when combined contribute to generating interference are represented in an interference capsule of action elements. An action element may be either active or passive, for instance depending whether or not a subscriber has a service, i.e. an action element, activated or not. An action element is defined as being a representative of an arbitrary activity (subfunction) which when executed simultaneously with one or more other activities (subfunctions) may potentially give rise to interference. A combination of two or more active action elements is a potential interference event.

Thus, all combinations of two or more action elements can generate an interference event. The maximum number of interference events $n_{max}$ in an interference capsule is given by the following equation:

$$n_{max} = 2^{n_{ae}} - (n_{ae} + 1) \qquad (1)$$

where $n_{ae}$ is the number of action elements.

Thus, there belongs to each interference event a specific set of action elements which are decisive in whether the interference event is active or not. This set is referred to as the action set. The active action elements in the interference capsule determine unequivocally which interference events are active within the interference capsule. A set of interaction elements belongs to each interference event. Each interaction element represents a specific interaction which shall be executed or carried out because an interference event is active. This interaction is normally implemented in the form of software containing the logic required to resolve the interference. An interaction element is a representative of an arbitrary activity (interaction) undertaken in consequence of the activation of an interference event. The set of interaction elements present for an interference event is referred to as the interaction set. One and the same interaction element can be present in any number of interaction sets.

FIG. 1 illustrates an interference event 1 which has an action set 2 and an interaction set 3. The action set includes a number of action elements ae. The interaction set includes a number of interaction elements iae. As before mentioned, an action element may be either active or passive. In order for an interference event to be active, it is necessary to fulfil two criteria: (1) that all action elements ae in the action set of the interference event are active; and, (2) that the action set of the interference event is not a subset of an action set of another active interference event.

Thus, all combinations of two or more action elements are possible action sets for specific interference events. Pascal's triangle, shown in FIG. 2, can be applied to establish the number of possible or potential interference events with a specific number of input action elements. When the coefficients in a horizontal row in FIG. 2 are added together, there is obtained the total number of possible interference events that are found in an interference capsule with a number of action elements corresponding to the row number. The horizontal rows are imagined to be numbered in sequence from the top, beginning with 0. The rows extending diagonally upwards to the right signify the number of possible interference events that have a predetermined number of action elements. The predetermined number of action elements can be said to form a combination of a grade which is equal to said predetermined number. The coefficient located at the point of intersection of a horizontal row with a diagonal row indicates the number of possible interference events of the given grade in an interference capsule having a number of action elements corresponding to the row number. As is known, Pascal's triangle discloses the number of possible ways of selecting combinations of k elements from n elements. The ones in the diagonal row located furthest to the left discloses the number of combinations of grade 0, i.e. the number of combinations that are obtained with no (0) action element ae. No action element gives one combination and thus one set, i.e. the empty set. The empty set represents one (1) combination, this giving rise to the 1s (ones) in this diagonal row. The next following horizontal row discloses the number of combinations of grade 1, i.e. all combinations which consist of one element. If the action set contains one action element, one combination is obtained. This combination is the right-hand one (1) in row no. 1. If the action set contains two action elements, two combinations are found, each with one element, which is represented by the coefficient 2 in row no. 3. If the action set contains three elements, three combinations, each one having one element, are found. This is represented by the coefficient 3 on the left of row no. 3. Since no interference can occur when no elements are found, the diagonal row of ones is excluded, since this row is of no interest. The next following diagonal rows 1, 2, 3, 4, 5 ... 10 can also be excluded, since no interactions can occur in an action set which contains solely one action element. These two diagonal rows are shadowed in FIG. 2. The next following row (which discloses the number of grade 2 combinations) discloses the number of combinations of two action elements. The coefficient 1 in the intersection point between this row and row no. 2 discloses that in a group which consists of two interaction elements there is one (1) combination of two elements that can give rise to interference. In turn, this indicates a conceivable interference event, which is marked with a one (1) within the rectangle 4. If the action set comprised three elements instead, i.e. row no. 3 (the fourth horizontal row from the top), there would be found three combinations each of two elements that could give rise to interferences, and also one combination of three elements, i.e. all elements in the action set, that could give rise to interference. The sum of these two latter coefficients gives the maximum number of possible interference events, in this case four events. This is indicated by the numeral 4 in the rectangle 4 in FIG. 3.

If the action set includes four action elements, corresponding to row no. 4 (the fifth horizontal row from the top), there is thus six combinations each of two elements, four combinations each of one element and one combination of four elements, i.e. a total of 11 possible interference events. It is apparent from the above that the number of possible interference events increases exponentially. In order to illustrate the problem of interaction, reference is again made to the example wherein a telephone network may include seventy different available services. The theoretical number of possible interactions between seventy services is unbelievably large. Since services and the possibility of introducing new services have become a competitive feature, it will be understood that there is a need for the creation of new tools and methods by means of which a stable structure can be obtained in telecommunications systems. In this regard, it is meant by stable that an existing service need not be changed when adding a new service to or removing an existing service from the system. Remaining services shall not be influenced when the new service is added to the system or the existing service is removed therefrom, even when the services concerned can coact with existing services in the telecommunications system.

Figure 3:
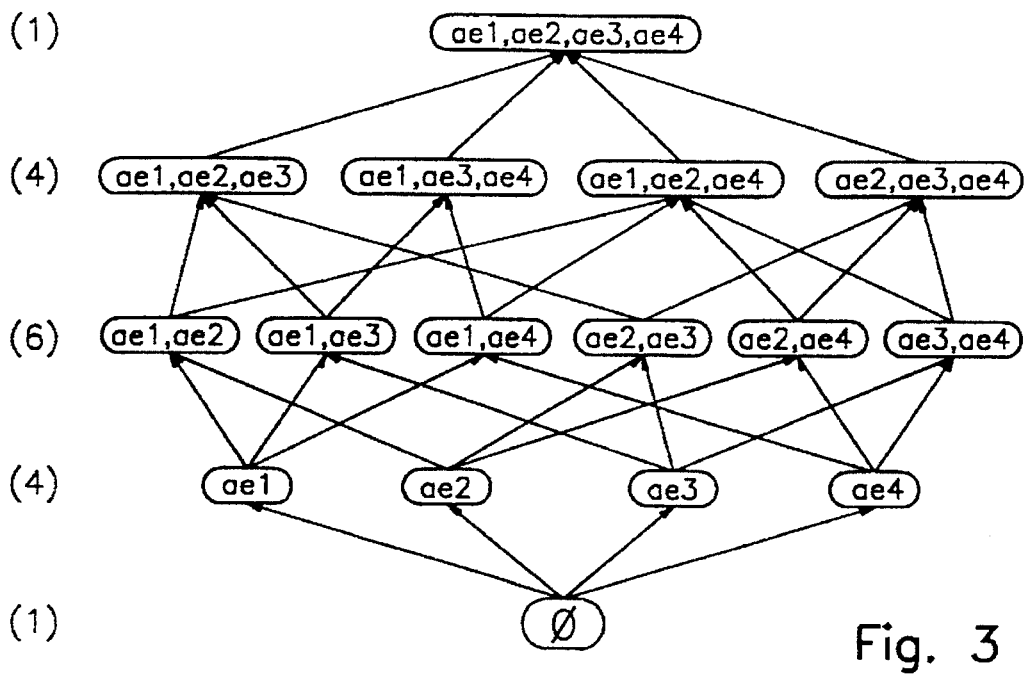
FIG. 3 illustrates the number of ways in which it is possible to combine from 0 to 4 elements with one another in a set, and the logic dependencies between the sets.

FIG. 3 illustrates a manner of illustrating graphically a horizontal row in Pascal's triangle shown in FIG. 2. FIG. 3 illustrates the fifth horizontal row from above, i.e. the row that contains the coefficients 1, 4, 6, 4, 1. The illustrated structure is called a binomial tree and discloses the number of ways in which 0 to 4 elements can be combined in a set. Each node in the tree structure represents a specific combination of action elements ae. The action elements in the group are ae1, ae2, ae3 and ae4.

Figure 4:
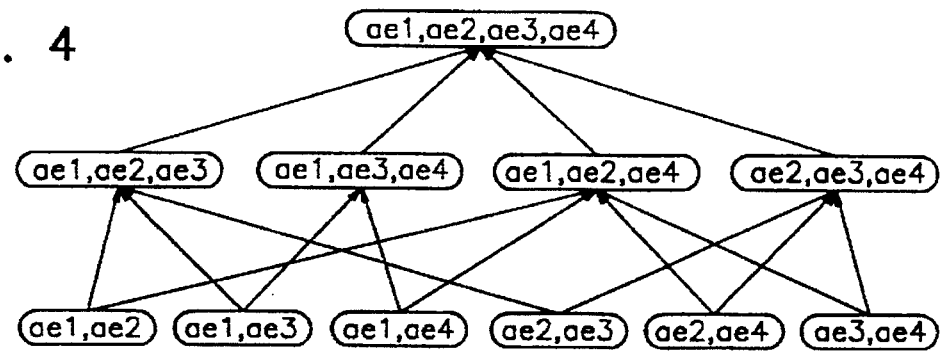
FIG. 4 illustrates a truncated binomial tree comprising four elements.
Figure 5:
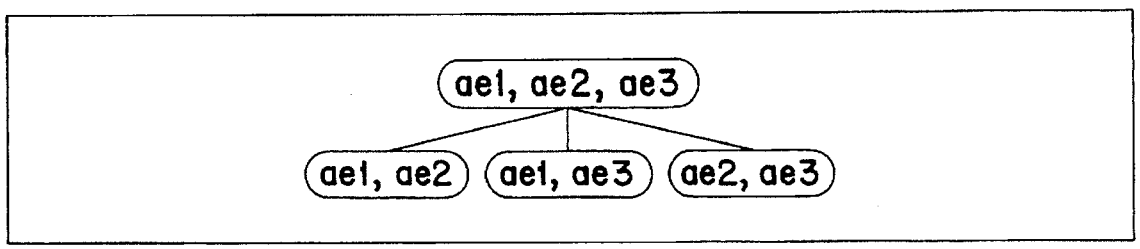
FIG. 5 illustrates a truncated binomial tree comprising three elements.
Figure 6:
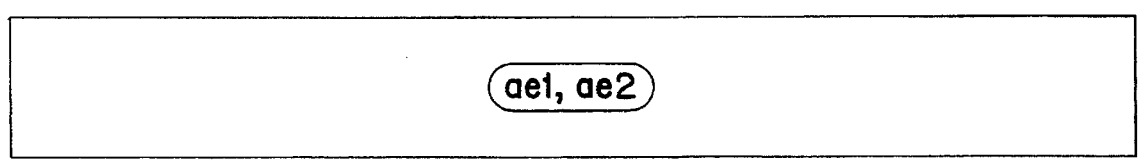
FIG. 6 illustrates a truncated binomial tree comprising two elements.

FIG. 4 illustrates the binomial tree obtained when drawing only those action sets that can belong to an interference event. The two lowermost levels in the binomial tree shown in FIG. 3 have thus been removed and what remains of the binomial tree in FIG. 4 is what Applicant has elected to call a "truncated" binomial tree. FIG. 4 shows that action sets, that can give rise to interference events, may be subsets of each other. The sets of underlying nodes are subsets of the sets of overlying nodes. Basic elements in a truncated binomial tree are the sets which include two action elements, i.e. the six nodes at the bottom of FIG. 4. This is so because at least two actions are required for an interference to occur. The truncated binomial tree shown in FIG. 4 is related to the number of possible interactions between four elements. FIG. 5 shows a truncated binomial tree which is related to the number of possible interactions between three elements. FIG. 6 shows an example of a truncated binomial tree which is related to the number of possible interactions between two elements.

Figure 7:
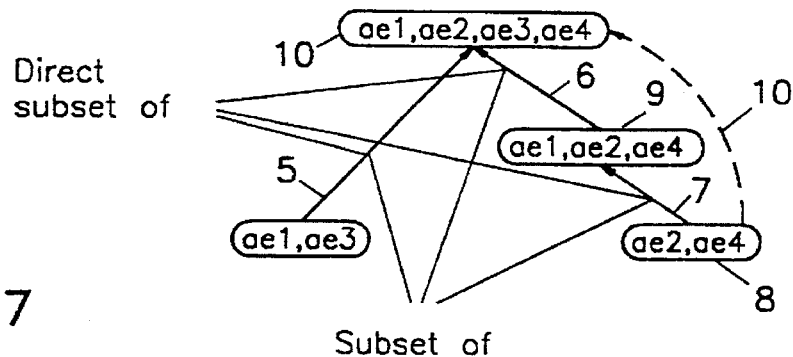
FIG. 7 illustrates the relationship "direct subset of"

FIG. 7 illustrates a term which Applicant has elected to call "direct subset of". The arrows 5, 6 and 7 in FIG. 7 describe the relationship "direct subset of". A node 8 which contains the subset {ae2, ae4} is a direct subset of the set {ae1, ae2, ae4} in a node 9. The subset {ae1, ae2, ae4} of the node 9 is, in turn, a direct subset of the set {ae1, ae2, ae3, ae4} of the node 10, as illustrated by the arrow 6. The set {ae2, ae4} in node 8 is a subset of the larger set {ae1, ae2, ae3, ae4} in node 10, but since the set {ae2, ae4} is also a subset of the set {ae1, ae2, ae4}, the set {ae2, ae4} is said to be a direct subset of the smaller set {ae1, ae2, ae4} in node 9. The broken line arrow 10 is intended to indicate that the set in node 8 is not a direct subset of the larger set in node 9. By "direct subset of" is meant the relationship between a node which lies immediately beneath another node.

Interference Event Tree

A truncated binomial tree is a way of presenting graphically all possible action sets that are found in an interference event capsule. As described with reference to FIG. 1, a specific action set is found for each interference event. This means that the nodes of the binomial tree will also represent all of the interference events that are possible theoretically, i.e. the potential interference events. When new action elements are added to an interference capsule, the number of potential interference events will increase exponentially. C.f. equation 1 above. When a new action element is added to an interference capsule, it will not normally mean that all new action combinations (action sets) will each give rise to a respective unique behaviour. A formal explanation of what is meant by "unique behaviour" will be given below. At the moment, it is assumed that not all combinations will be affected when adding a new action element to the interference event capsule. This means that some nodes in the binomial tree, i.e. some action sets, will not be associated with an interference event and that such nodes can be said, instead, to belong to "free" interference events. These nodes are referred to as "free" nodes in the following.

Figure 8:
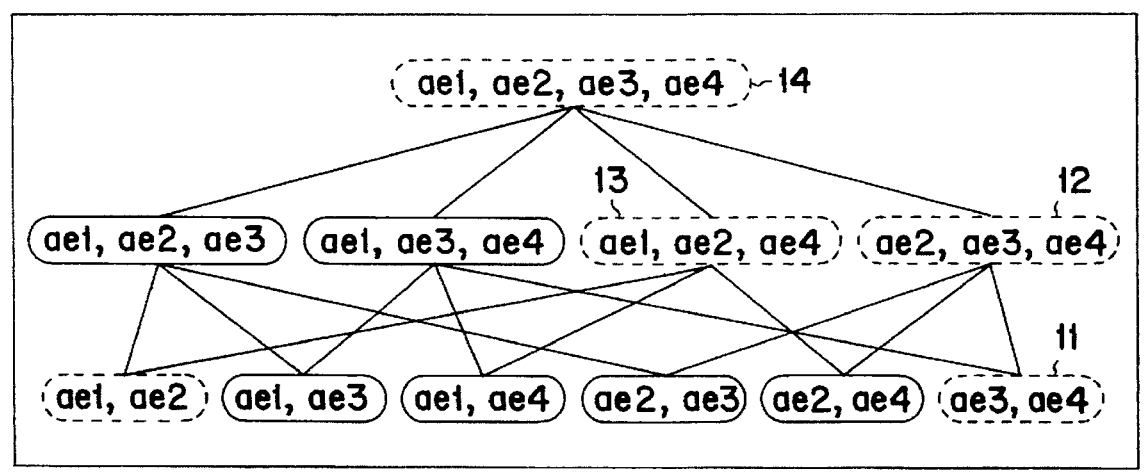
FIG. 8 illustrates a truncated binomial tree in which broken-line nodes are "free" nodes.
Figure 9:
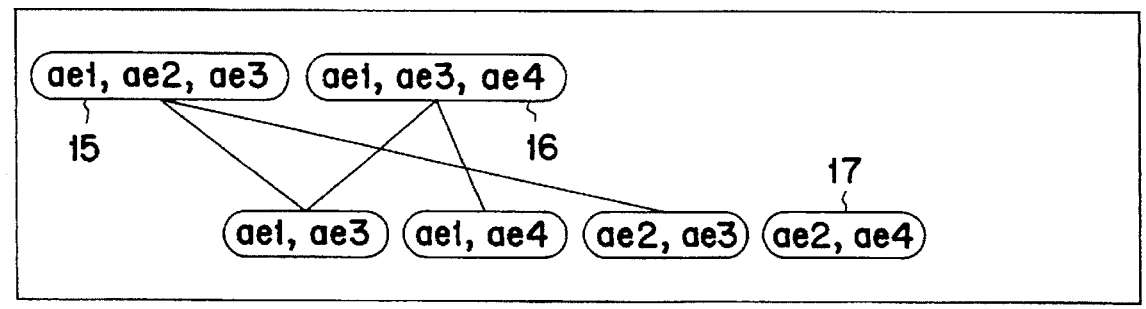
FIG. 9 illustrates the truncated binomial tree of FIG. 8 from which "free" nodes have been omitted.
Figure 10:
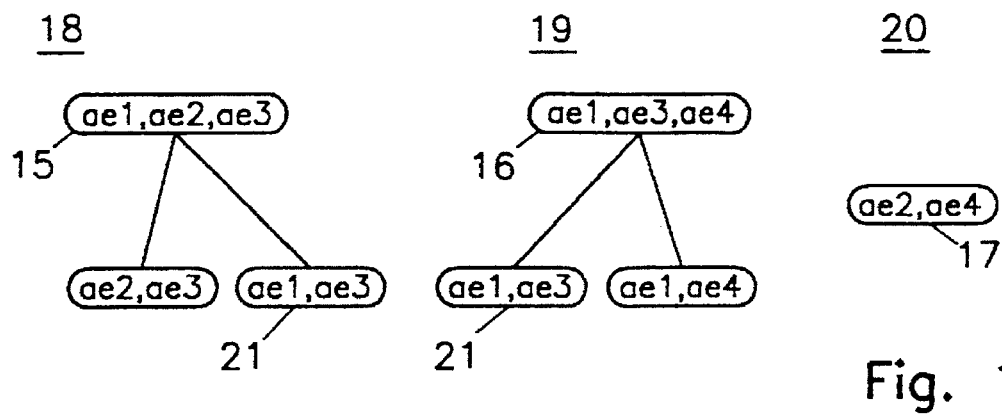
FIG. 10 illustrates three interference event trees obtained from FIG. 9.

FIG. 8 is connected with FIG. 4 and illustrates a number of free nodes 11, 12, 13, 14 in broken lines. The nodes framed in broken lines are said to belong to "free interference events". Since free nodes are of no interest from the aspect of interference events, they can be omitted from the graphic representation of the action sets found in an interference event capsule. There is then obtained a tree structure of the kind illustrated in FIG. 9. The nodes shown in FIG. 9 are thus representatives of all combinations that give rise to interference. FIG. 9 is thus what remains of FIG. 8. In FIG. 9, it is said that action sets, which are not direct subsets of an overlying set, form a root of what Applicant calls an interference event tree. If all nodes which lie above a specific node in the binomial tree are "free", then the specific node is also the root of an interference event tree. Thus, each of the nodes 15, 16 and 17 in FIG. 9 is the root of its respective tree. These new trees are called interference event trees and are shown in FIG. 10. An interference event tree is thus a group of events where something must be done in order to rectify undesirable interferences. With regard to the definition of a root given above, it can be said that an interference event whose action set is not a direct subset of the subsets of any other interference events is an interference event root. An interference event is thus an interference event root when its action set is not included as a subset in the action set of some other interference event.

The graphic representation of the relationships between interference events forms no part of the present invention, but is a method of illustrating these events. Other types of representation are, of course, possible.

The interference event trees in FIG. 10 are referenced 18, 19 and 20. Applicant has elected to present interference event trees graphically in this way, to illustrate that the same nodes can occur in more than one tree. C.f. node 21 containing the action elements {ae1, ae3} which occur in two trees. The node {ae1, ae3} is a direct subset of both {ae1, ae2, ae3} and {ae1, ae3, ae4} and could have been shown alternatively as a node which has two relationships (graphically represented by two dashes) "direct subset". Generally speaking, in the case of the chosen graphic representation, one and the same node can occur in a number of different interference event trees.

Figure 11:
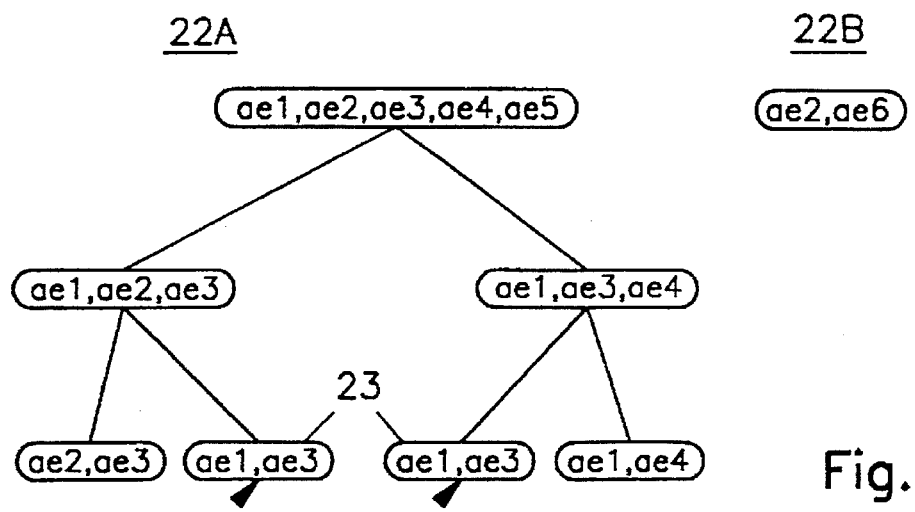
FIG. 11 illustrates two interference event trees in which one and the same node occurs at several locations in one of the interference event trees.

FIG. 11 illustrates two new interference trees 22A, 22B which have no connection with the earlier examples. The Figure is intended to illustrate the fact that a node, in this case the node 23 containing the action elements {ae1, ae3}, can occur several times in one and the same interference event tree, in this case the interference event tree 21.

In summary, one and the same node can occur in several different interference event trees and also several times within one and the same tree. This is due to the selected graphic representation, which does not form part of the invention, however.

Figure 12:
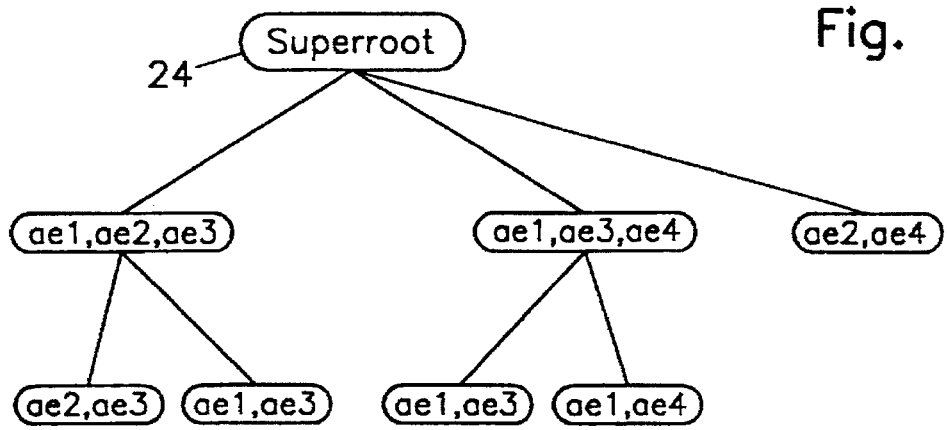
FIG. 12 illustrates a supertree.

According to the invention, all interference event trees that belong to the interference capsule are collected together under what Applicant has elected to call super root, therewith obtaining the tree structure illustrated in FIG. 12. A relationship between the different interference event trees is created in this way. The super root is referenced 24. FIG. 12 is connected to FIG. 10. In this way, all nodes in the interference capsule will lie under the super root and the tree obtained is called a supertree. As mentioned above with reference to FIGS. 12 and 13, one and the same node can occur in different interference event trees (FIG. 10), and one and the same node may also occur several times in one and the same interference event tree (FIG. 11). This method of structuring interference events in interference event trees applies to each interference capsule, irrespective of the capsule concerned. The nodes in an interference event tree always have the relationship "direct subset" to an overlying node, unless the node represents the interference event root. Super roots are roots to all interference event roots and are in themselves not an interference event, but solely a graphic subject.

The supertree is used in real time to determine which interaction logic must be observed when a given subscriber has activated a given number of services. The supertree is used to search for the interaction software that belongs to the services which a subscriber for the moment has activated and that must be added to the basic software for the process in question. For instance, if a subscriber has activated two services of which one is represented by the action element ae2 in FIG. 12 and the other is represented by the action element ae3 in FIG. 12, then it is precisely the interaction logic that belongs to the interference event containing the action set {ae2, ae3} that shall be added to the basic software. C.f. FIG. 1, which shows that a specific action set and a specific interaction set is found for each interference event. For instance, when the action set {ae2, ae3} in FIG. 12 is active the interaction software representative of the interaction set of this interference event {ae2, ae3} is added to the basic software. This will be described in more detail below. The supertree applies to all subscribers, or users, and to all different arrays of services that a subscriber may have activated. When introducing new services into the system, it is necessary to check whether or not all additional, new combinations represent an interference event. If new interference events are found to be present, new interference event trees will also come into existence and/or new branches are added to existing interference event trees, although the existing tree structure need not be changed.

Interference Event—Free Interference Event

The manner of determining whether a given action set belongs to an interference event or to a free interference event will now be described in more detail. In order for a combination of action elements to give rise to an interference event, called the investigated interference event, it is necessary that the action set of the combination will not have direct subsets that belong to other interference events which together generate the same behaviour as the investigated interference event. This is also the definition of "unique behaviour" required for a given combination of action elements to result in an interference event. With regard to this definition, it can be said that:

(2) If a set A of action elements means that a set Q of interactions shall be performed, the set A belongs to a new interference event when all direct subsets $B_j$ {j=1, 2 ... 5} of A belong to an interference event whose interaction sets $R_j$ are structured so that $$Q \neq \bigcup_{j=1}^{j=t} R_j$$

Expression (2) states that: In order for the set A to belong to an interference event, it is necessary for the interaction set Q to differ from the union of the interaction sets $R_j$. Thus, an interference event is a set of action elements whose interaction set has a unique behaviour, i.e. a behaviour which differs from (and thus is not solely a combination of) the union of the behaviours that the interaction sets of the direct subsets present to this set.

(3) A further requirement may be that:

$$R_m \cap R_n \neq 0, \text{ där m, n} \in \text{j och m} \neq \text{n}$$

(i.e. all subsets $R_j$ are disjunct).

The expression (3) states that: The section between the interaction sets $R_j$ shall be zero, i.e. the various interaction sets may not have any common interaction element. The expression (3) is not necessary to the application of the invention.

Figure 13:
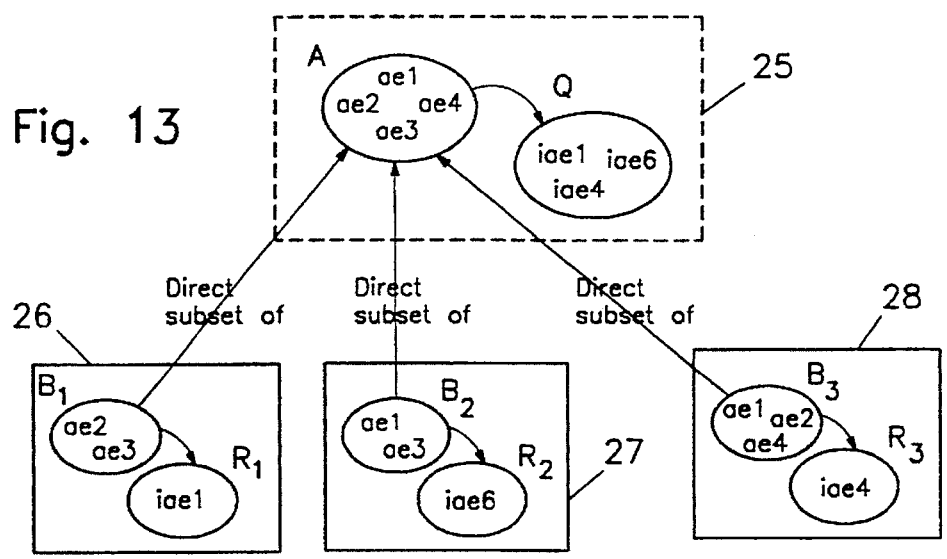
FIGS. 13, 14 and 15 each show an example of a possible interference event and the methodology used to ascertain whether or not a possible interference event is also an actual interference event.
Figure 14:
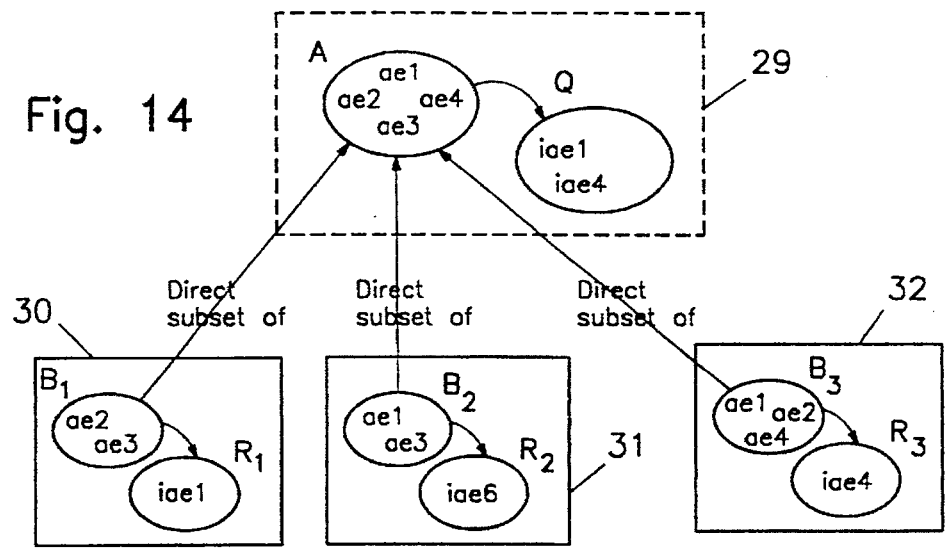
Figure 15:
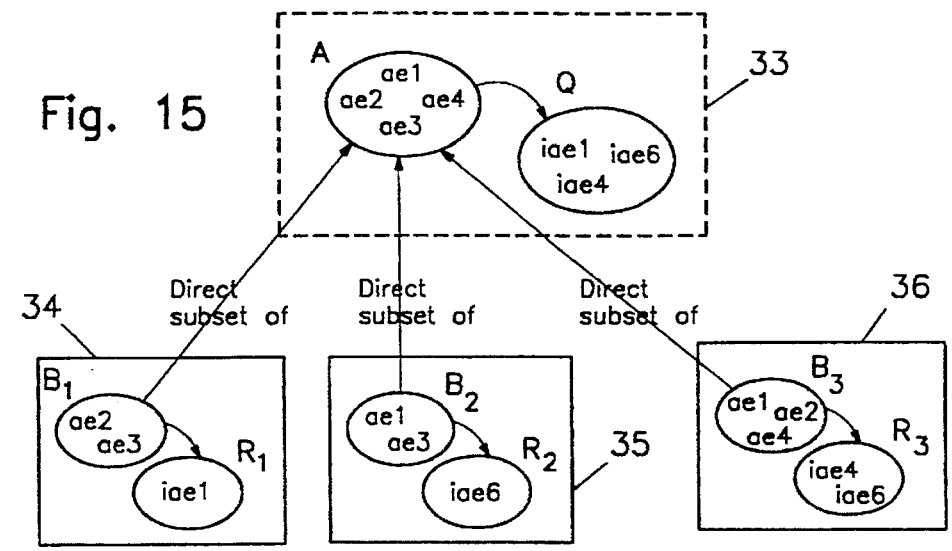

FIGS. 13, 14 and 15 illustrate the aforesaid. FIG. 13 illustrates a possible interference event 25 and three interference events 26, 27 and 28. The possible interference event 25 has one action set A and one interaction set Q, each including the illustrated respective action elements and interaction elements. Similarly, each interference event 26, 27, 28 includes a respective action set B1, B2 and B3, each having the given action elements, and a respective interaction set R1, R2 and R3 which present the illustrated interaction elements. Each of the action sets B1, B2 and B3 is a direct subset of the action set A of the possible interference event. This is indicated with the full-line arrows. However, the possible interference event 25 is not an interference event, because the interaction sets R1, R2 and R3 are equal to the interaction set Q according to expression (2) and the interaction sets R1, R2 and R3 are disjunct according to expression (3).

FIG. 14 illustrates another possible interference event 29 to the action set A of which three action sets B1, B2 and B3 are direct subsets. B1 belongs to a first interference event 30 with the interaction set R1. B2 belongs to a second interference event 31 with the interaction set R2. B3 belongs to an interference event 32 with the interaction set R3. The elements in the sets shown in FIG. 14 differ from those shown in FIG. 13. In this case, the possible interaction event 29 is a actual interference event according to expression (2), because the union of R1, R2 and R3 is not equal to Q. In order to resolve the interference between the action elements in the action set A, there is required a procedure which will distinguish from the sum of the procedures in the interference events 30, 31 and 32.

FIG. 15 illustrates another possible interference event 33 to the action set A of which the action sets B1, B2, B3 in three interference events 34, 35 and 36 are direct subsets. In this case, the possible interference event 33 is not an interference event, because the interaction sets R1, R2 and R3 are not disjunct and do not satisfy the expression (3). The interaction element iae6 namely occurs in both R2 and R3.

Configuration

Having knowledge of which the action elements that are active and having knowledge of the supertree the interference capsule, i.e. the process, can be configured with the correct supplemental software for an individual execution event. The supertree can be used for this analysis to which active action elements are input data. Since free interference events are found, c.f. FIG. 8, several interference events may be active simultaneously in one and the same supertree. However, an interference event cannot be active when its action set is a subset of the action set of another active interference event. Since the action set of a specific interference event can occur in several nodes in the supertree, it is necessary for all nodes in which these action sets occur to be "active" in order for the specific interference event to be active.

Figure 16:
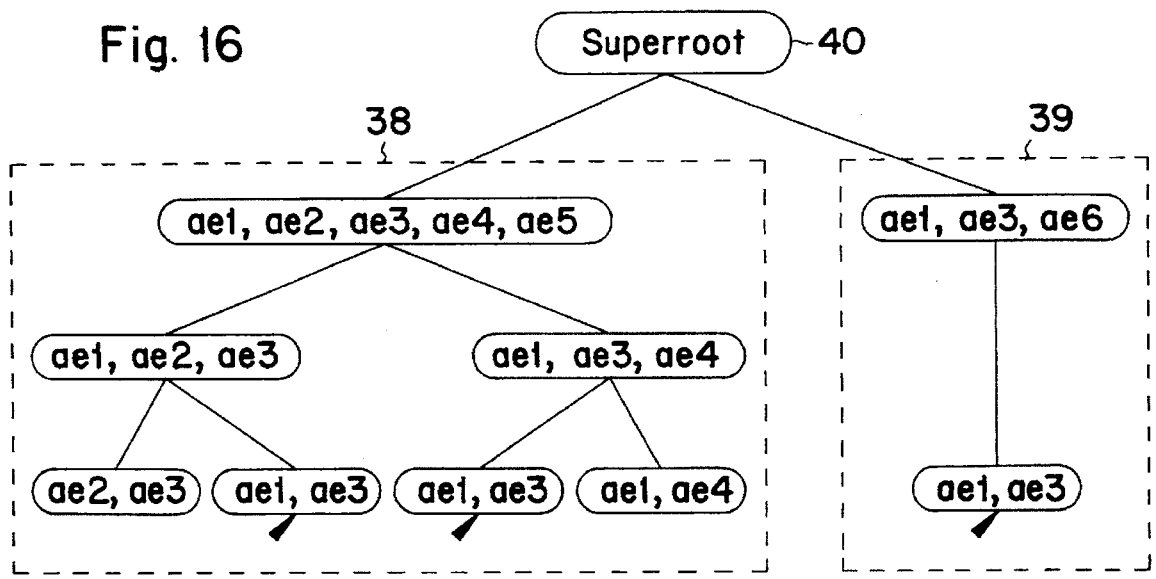
FIG. 16 illustrates a supertree which is different from the tree shown in FIG. 12 and which is comprised of two interference event trees, wherein one and the same action set occurs several times in one and the same tree and also in the two different interference event trees.
Figure 17:
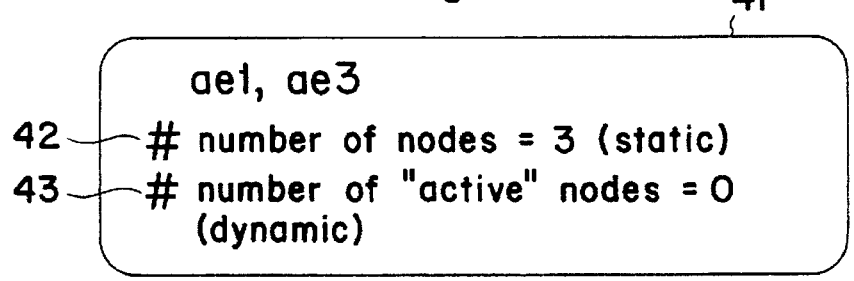
FIG. 17 shows a configuration of an object which represents an interference event.

FIGS. 16 and 17 illustrate the possibility of ascertaining whether or not an interference event is active. FIG. 16 illustrates a supertree 37 which is comprised of two interference event trees 38, 39 and a super root 40. FIG. 16 is not connected with any of the earlier described Figures. As shown in FIG. 16, the node ae1, ae3 appears twice in the interference event tree 38 and once in the interference event tree 39.

FIG. 17 shows the nodes having the action sets {ae1, ae3} in FIG. 16. These nodes are represented by an object 41. This object contains two attributes 42, 43. Attribute 42 denotes the number of nodes in which the action set {ae1, ae3} occurs in the supertree. This information is static information for this action set in the supertree. The attribute 43 is useful when using the supertree and is counted up to one each time the analysis indicates that the action set is active. The attribute 43 is accordingly dynamic and the value of the attribute can therefore change during each analysis. All dynamic attributes present are set to zero after analyzing the supertree. If the attribute 43 has been counted up to the same value as that presented by the attribute 42 during an analysis, the interference event for this action set is then active. According to the example shown in FIG. 16, the static attribute 42 shall be set to 3, because this action set occurs in three nodes in the supertree.

An Example of an Analysis for Finding Correct Interaction Software

The following three examples refer to FIGS. 16 and 17.

EXAMPLE 1

In this example, a user is assumed to have ae1 and ae3 active. Input data ae1, ae3 are fed into an analyzing unit, described below. The object of the analysis is to find the interaction software specific for this particular case that shall be activated in the process (which is represented by the interference capsule). It is first ascertained whether or not the user has a ae1, ae2, ae3, ae4, ae5 (=the root of the interference event tree 38 in the supertree) active.

The answer is no. The analyzing unit then ascertains whether or not the subscriber has ae1, ae2, ae3 active. The answer is no. The analyzing unit then ascertains whether the subscriber has ae2, ae3 active. The answer is no. The analyzing unit then ascertains whether the subscriber has ae1, ae3 active. The answer is yes and the attribute 43 is stepped from 0 to 1. The analysis is now continued to check whether or not the subscriber has ae1, ae3, ae4 active. The answer is no. The analyzing unit then ascertains whether ae1, ae3, are active and the answer is yes, wherewith the attribute 43 is stepped from 1 to 2. It is now ascertained whether or not the subscriber has ae1, ae4 active. The answer is no. The first interference event tree 38 has now been investigated. It now remains to investigate the interference event tree 39, and the analyzing unit ascertains whether or not the subscriber has ae1, ae3, ae6 (the root of the interference event tree 39) active. The answer is no. Finally, the analyzer ascertains whether or not the subscriber has ae1, ae3 active and the answer is yes, wherewith the attribute 43 is stepped from 2 to 3. The attribute 43 is now equally as large as the attribute 42 and it can therefore be concluded that ae1, ae3 is an active interference event and that the conflict resolving interaction software associated with the interference event shall be added to the basic software, in that the software represented by the interaction element of the interference event.

It will be understood that the algorithm according to which the supertree is investigated need not be the algorithm just described and that other algorithms can be used. Optimations can be made for making the analysis more effective.

EXAMPLE 2

In this example, it is assumed that a user has ae1, ae2 and ae3 active, wherewith ae1, ae2 and ae3 are fed into the analyzing unit. The object 41 for the node containing the action sets ae1, ae2, ae3 has the static attribute set to 1 (one), because this node only occurs once in the supertree. It is first ascertained whether or not the user has ae1, ae2, ae3, ae4, ae5 (=the root of the interference event tree 38 in the supertree) active. The answer is no. The analyzing unit then ascertains whether or not the user has ae1, ae2, ae3 active and the answer is yes. The dynamic attribute is now stepped to 1 and becomes equally as large as the value of the static attribute. It can therefore be concluded that the interference event containing the action sets ae1, ae2, ae3 is active. The analysis is not continued on the underlying nodes (which represent subsets of the action set ae1, ae2, ae3). The analyzing unit then ascertains whether or not the subscriber has ae1, ae3, ae4 active. The answer is no. The analyzing unit then ascertains whether or not the subscriber has ae1, ae3 active. The answer is yes. The dynamic attribute in the object representing this node (ae1, ae3) is stepped from 0 to 1. The analyzing unit then ascertains whether or not ae1, ae4 are active. The answer is no. The analyzing unit then tests whether or not the subscriber has ae1, ae3, ae6 active. The answer is no. The analyzing unit then tests whether or not ae1, ae3 is active. The answer is yes and the dynamic attribute in the object representing this node (ae1, ae3) is stepped from 1 to 2. The analysis is now completed. The interference event with the action set ae1, ae2, ae3 has been found active. The interference event with the action set ae1, ae3 is not active, because the dynamic attribute for this node is only stepped up to 2 (the static attribute is 3).

EXAMPLE 3

In this example, a user is assumed to have the action elements ae1, ae3, ae6 active. These elements are fed to the analyzing unit as input data. Investigation of the supertree is halted the first time the analysis meets the combination ae1, ae3, ae6 in the supertree, and the interference event having the action set ae1, ae3, ae6 is thus found to be active. No analysis of the subset ae1, ae3 is undertaken in the interference event tree 39. When investigating the interference event tree 38, the dynamic attribute is stepped-up from 0 to 1 the first time the node with the action set ae1, ae3 is investigated, and from 1 to 2 the second time the node with the action set ae1, ae3 is investigated, but since the node with the action set ae1, ae3 in the interference event tree 39 is not investigated, the dynamic attribute is never stepped up to 3. The interference event with the action set ae1, ae3 is thus not active.

A Method of Producing an Interference Event Tree

Figure 18:
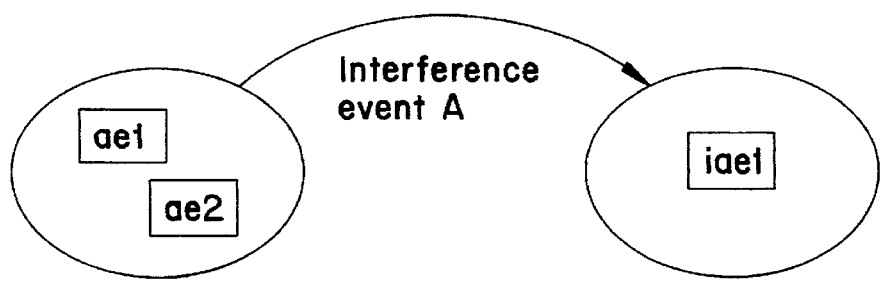
FIG. 18 shows an interference event with action set and interaction set.
Figure 19:
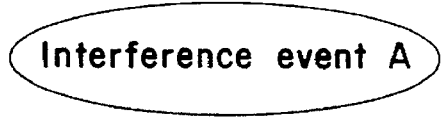
FIG. 19 illustrates an interference event tree for the interference event shown in FIG. 18.

FIG. 18 illustrates an action set having two action elements ae1, ae2 in an interference event A. When both action elements are active, the interaction iae1 shall be performed. Since the interference event tree has only one node in the illustrated case, the node is also the root in the interference event tree. This interference event is shown in FIG. 19.

Figure 21:
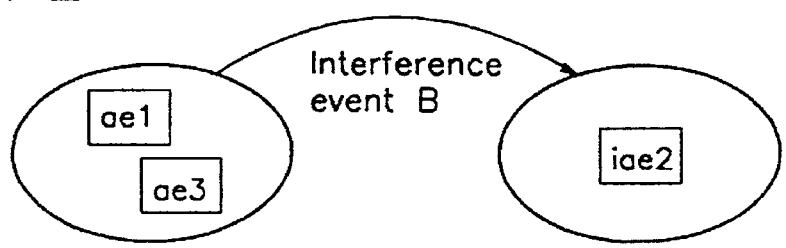
FIG. 21 illustrates a new interference event as a result of the addition of the action element in FIG. 20.
Figure 22:
FIG. 22 illustrates the occurrence of a further interference event tree as a result of adding the action element according to FIG. 20.

An additional action element ae3 is now added to the interference capsule. This results in three additional action sets. Thus, three further possible interference events are found. It is necessary to investigate each of the additional action sets, in order to discover whether or not they are actually interference events. The action set 45 is investigated first. If the investigation shows that something must be done to resolve possible interference between the action elements ae1, ae3, an interaction shall therefore be performed. This interaction may, for instance, be represented by an interaction element iae2. The possible interference event is therewith also an actual interference event, see FIG. 21. If the action set including the combination ae2, ae3 does not require any action to be taken, it is probable that the interference event with the action set 44 is a "free" interference event. If the action set 46 with the elements ae1, ae2 and ae3 causes the interactions represented by iae1 and iae2 to be carried out, the interference event with the action set 46 also becomes a "free" interference event, because the conditions in expressions (2) and (3) aboe are not fulfilled. There are now two interference events in the interference capsule. This is illustrated in FIG. 22. These are also interference event roots, since none of the action sets of the interference event are subsets of the action set of some other interference event. FIG. 22 therefore shows two interference event trees.

Figure 20:
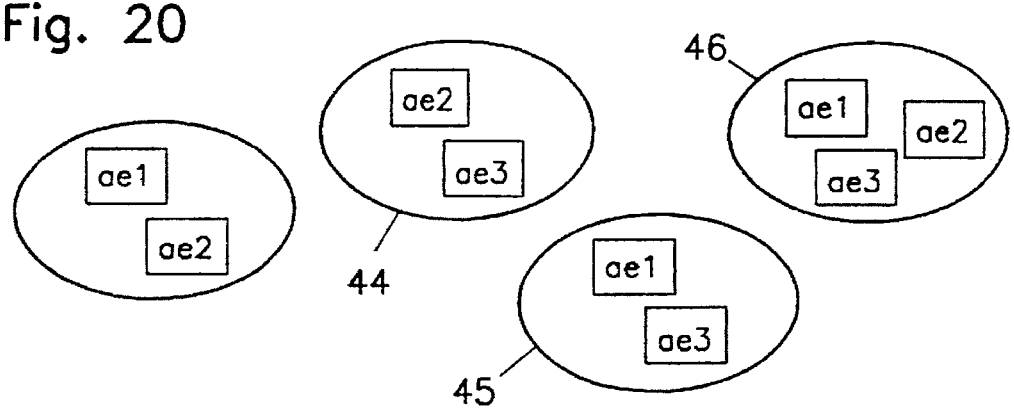
FIG. 20 illustrates the addition of an action element ae3 to an interference capsule including the action elements ae1, ae2, wherewith three possible interference events occur.
Figure 23:
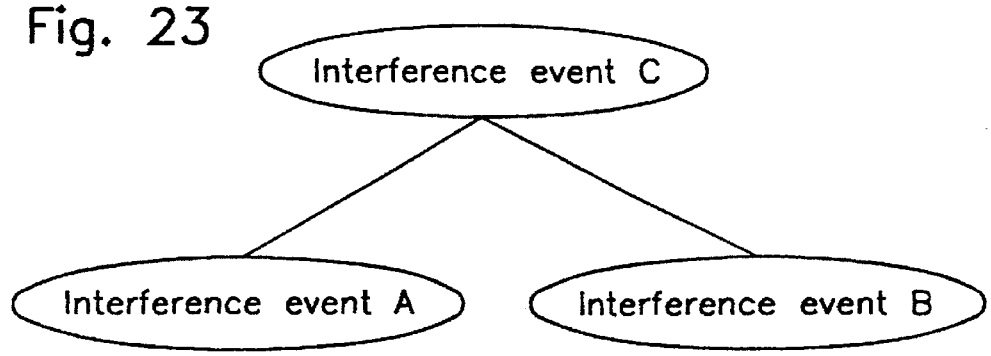
FIG. 23 shows an interference event tree that would occur if yet another possible interference event in FIG. 20 is found to be potential or an actual interference event.

If, on the other hand, the action set 46 with the combination ae1, ae2 and ae3 in FIG. 20 should cause some other interaction, e.g. iae3, to be performed, or causes no action to be taken, this would mean that the conditions in expression (2) and, when applicable, in the expression (3) are fulfilled and that this action set now becomes a further interference event and that this new interference event, referenced C, is also an interference event root, as illustrated in FIG. 23. FIG. 23 thus shows an interference event tree.

When an action element is added to an interference capsule, it can influence the supertree such as to cause new interference event trees and/or new branches to existing interference event trees to appear and/or that existing interference event trees are combined. This existing structure is not changed. This applies irrespective of the chosen graphic representation.

The following process is followed for creating the new supertree when adding an action element:

STEP 1: All new action sets are generated and presented. Action sets which have earlier been defined as belonging to interference events or free interference events can be ignored, since they are not changed by the addition.

STEP 2: The newly added action sets belong to possible interference events. Each interference event is now investigated with respect to the procedures that shall be undertaken when the current combination of action elements is active. A start is made with the possible interference events having action sets of two elements. Successive investigations are then made of the interference event with action sets of three elements, and so on. The nodes in the binomial tree which represent actual interference events with the relationship "direct subset of" are linked successively together, wherein interference event trees occur/are combined/are developed. Expression (2) and, when applicable, expression (3) is/are used to determine whether or not the possible interference events are actual or free interference events. The possible interference events are therewith defined as actual interference events or as free interference events.

STEP 3: If no action set is found to which the investigated action set is a direct subset, the interference event of the investigated action set will be an interference event root in an interference event tree.

In order to illustrate the relationship between the construction and definition of interference events on the one hand, and how the construction is used in the analysis on the other hand, reference is made to FIGS. 32, 33 and 34. These Figures also show that the addition of action elements will not change the existing structure of an interference event tree. FIG. 32 shows an interference event tree in which the nodes 66, 67 and 68 are all assumed to define a respective interference event. The interference capsule from which the tree is constructed contains three action elements ae1, ae2, ae3. A new action element, ae4, is now added to the interference event capsule represented by the interference event tree in FIG. 32. As a result of this addition of the action element ae4, seven new nodes occur as candidates to interference events, namely the three nodes 69, 70 and 71 each having two elements, the three nodes 72, 73 and 74 each having three elements, and the node 75 which has four elements. These possible or potential interference events are shown in FIG. 33 together with the interference event tree from FIG. 32. It shall now be ascertained whether or not these possible interference events 69–75 are also actual interference events. This investigation is effected by first comparing the nodes that have the least number of action elements with the specification of the service, in order to establish whether or not an interference event exists. Each of the nodes having the next largest number of action elements are then compared with the service specification and with interaction sets of the sets of each of these nodes, in order to establish whether or not a possible interference event exists. This latter process step is repeated for each node having the next following number of action elements in sequence. The last step in the process is carried out on the nodes that have the maximum number of active action elements and the subsets of these nodes are investigated with the intention of establishing whether or not possible interference events exist. In the specific example illustrated in FIGS. 31–34, a start is made by investigating the 2-combinations 69, 70 and 71. Initially, a comparison is made with the service specification to ascertain whether or not any particular procedure must be undertaken for the combination in node 69, i.e. whether or not anything must be done in the (ae1, ae4)-case. If something in particular is to be undertaken, then the node 69 is an interference event. If nothing in particular needs to be undertaken, the node is not an interference event. In the case of the illustrated example, it is assumed that no particular action need be taken and that the node is therefore not an interference event, which is indicated in the Figure by crossing out the node. The nodes 70 and 71 are investigated in a similar way. It is assumed in the illustrated case that the combination in the node 70 requires some particular action and that this node therefore represents an interference event. However, no particular action is required in the case of the node 71, and this node has therefore been crossed out in the Figure. After having investigated the 2-combinations, the investigation is continued with the 3-combinations. The investigation is begun by looking at the combination ae1, ae2, ae4 and the subset 70 thereof. If the combination ae1, ae2, ae4 requires some sort of action which either goes above that which or is less than that which was required in node 70, then the node 72 is an interference event. If, on the other hand, the action required at node 72 comprise the same interference resolving functions as those required for node 70, then node 72 is not an interference event. It is assumed in the example shown in FIG. 33 that node 72 is not an interference event and the node has therefore been crossed out in the Figure. The next following 3-combination is investigated, in this case the node 73, which presents the action elements ae1, ae3, ae4. The node 73 is investigated by comparing it which its subsets 66 and 71. It has earlier been established that the subset 71 is not an interference event and is therefore excluded from comparison. The node 66 remains. If the action required (which is obtained from the service specification) at node 73 is the same as that required in node 66, then node 73 is not an interference event. The example assumes that node 73 is not an interference event and the node has therefore been crossed out in the Figure. Finally, the node 74 having the action elements ae2, ae3, ae4 is compared with its subsets 69 and 71 having the action elements ae2, ae3 and ae3, ae4 respectively. Node 71 with the elements ae3, ae4 is not an interference event and therefore it is necessary to only compare node 74 with node 67. It is assumed in this example that the action required in node 74 is the same action as that undertaken in node 67, and consequently node 74 is not an interference event and has been crossed out. The investigation made hitherto has shown that only node 68 and node 70 form direct subsets to the possible interference event 75, which is now in turn for investigation. The direct subsets are represented by the arrows 76 and 77. The circled structure 78 in FIG. 33 is the original interference tree in FIG. 32. The investigation as to whether or not the node 75 having the four action elements ae1, ae3, ae4 is an interference event is begun in the same way as earlier, by investigating the direct subsets to the node, in this case the subsets 68 and 70. If the action or procedures carried out in the interference event for node 68 and the action or procedures carried out in the interference event in node 70 is the sum of what is required in the 4-combination in node 75 in accordance with the specification, then the node 75 is not an interference event. On the other hand, if it is necessary to perform some other action, i.e. if the action required for node 75 differs from the sum of the actions that are required in nodes 68 and 70, then the node 75 is an interference event. It is therefore not necessary to investigate the nodes 66 and 67, since the latter are not direct subsets to node 75. (They are, however, direct subsets to node 68). In this way, there has been defined what is an interference event in accordance with the invention. There is obtained an interference event tree having the appearance shown in FIG. 34. It is this interference event tree that is used in the analysis to find the supplemental software that shall be added to the basic software when running the process represented by the interference capsule. All of the action elements that are active are used as input data in the analysis, and the input data is matched against the largest (with respect to the number of active action elements) subset encountered in the interference event tree. The interaction set of the set encountered may be activated, but not interaction sets which belong to action sets from an interference event that has already been activated. Assume as a first example that the input data is ae1, ae3. The analysis begins furthest up in the interference event tree in FIG. 34 and it is found that ae1, ae3 does not coincide with the action elements in node 75 nor yet with the action elements in node 68. On the other hand, the input data does coincide with the action elements in node 66 but not with any of the action elements in the nodes 67 and 70. Thus, the analysis gives the result that the interaction set which corresponds to the action set ae1, ae3, i.e. node 66, shall be added to the basic software. Assume as another example that the action elements ae1, ae4 are activated. Subsequent to analyzing each of the nodes in the interference event tree in FIG. 34, it is found that none of the nodes matches the input data. This input data does not therefore give rise to the addition of supplemental software to the basic software. This is also to be expected when considering FIG. 33, in which it has already been established that ae1, ae4 is not an interference event, since the node 69 is crossed out. Assume as a third and last example of the analysis that the input data is ae1, ae2, ae3, ae4. The analysis begins in node 75 and a match is obtained already here. The analysis can therewith be terminated, since there is no need to look at subsets to the node 75. This node 75 namely contains all of the functions that must be carried out for the specific input data. It can be said, by the way, that if more interference event trees are found, the nodes is each of these trees must, of course, be investigated before the analysis can be terminated.

When an action element is removed from an interference capsule (e.g. because a service is removed from the telecommunications system), all of the nodes in which this action element occurs are removed. This is illustrated in FIG. 30 and FIG. 31.

Figure 30:
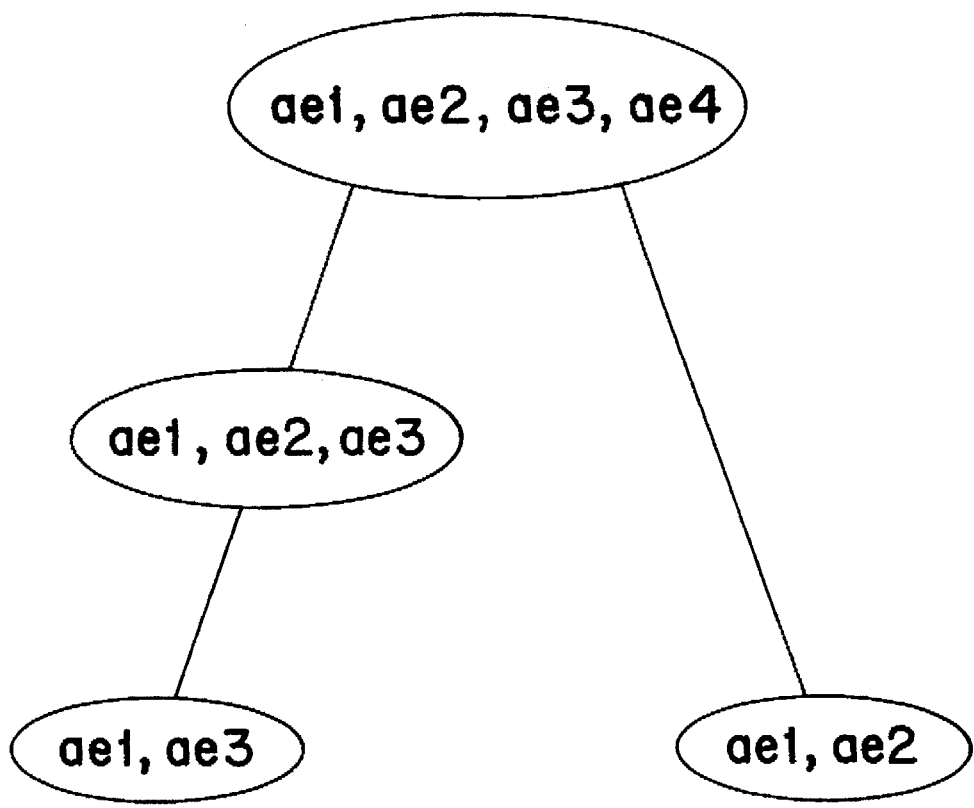
FIG. 30 illustrates an example of a supertree which includes an interference event tree.
Figure 31:
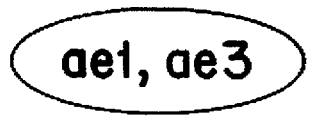
FIG. 31 illustrates the supertree shown in FIG. 30 after removing a service represented by the action element ae2.

FIG. 30 illustrates a supertree which has four action elements ae1, ae2, ae3, ae4. If the action elements ae2 is removed, all interaction events in which the action element ae2 is included disappear. That which remains is the supertree shown in FIG. 31. The node ae1, ae3, ae4, which might be expected to be what is left of the node ae1, ae2, ae3, ae4 when ae2 is removed, does not represent, however, an interference event. If ae1, ae3, ae4 was to represent an interference event it would appear as a direct subset of ae1, ae2, ae3, ae4. Since this is not the case, and consequently no combination ae1, ae2, ae4 remains when ae2 is removed. The links between remaining nodes in the supertree are not affected when removing the node.

Summary

Thus, neither the existing nor the remaining links between the nodes are influenced when adding or removing action elements.

EXAMPLES OF IMPLEMENTING THE INVENTION

An exemplifying embodiment of the invention will now be described with reference to three services and their interactions.

Services

"Diversion-on-busy (DOB)":

The DOB-service is a service which diverts a call to a subscriber to another number when the subscriber is busy on the telephone when a call from another subscriber/user arrives. A subscriber shall be able to activate and deactivate this service. When the subscriber activates the service, he gives a diversion number, i.e. the number to which calls shall be diverted when his telephone is engaged. The DOB-service is activated by keying-in a specific key sequence and the diversion number, *23*12345#. The DOB-service is deactivated by keying-in a specific key sequence, e.g. #23#.

"Call waiting (CW)":

The CW-service is a service in which a particular tone is heard in the telephone when a subscriber receives a telephone call while already speaking on the telephone. If the subscriber wishes to receive the call, he replaces the receiver and then immediately picks the receiver up, therewith connecting the new call and releasing the old call. If the subscriber does not wish to receive the new call, the calling subscriber will hear an engaged tone after a certain length of time has lapsed. The subscriber shall be able to implement the CW-service, i.e. to activate and deactivate the service. The CW-service is activated by keying-in a specific key sequence, e.g. *43#. The CW-service is deactivated by keying in a specific key sequence, e.g. #43#.

"Closed group (CG)":

The CG-service is a service in which the subscriber may only call predetermined numbers present on a predefined list of numbers, for instance a list of the telephone numbers of the subscriber's colleagues at his place of work. On the other hand, the subscriber is able to receive calls from other subscribers than those on the list. The subscriber shall be able to activate or deactivate the CG-service.

Interaction Between the Services

Between DOB and CV:

The call is diverted immediately. SV is not carried out.

Between VVU and SG:

When activating VVU, a check is made to ascertain whether or not the subscriber has the service SG. If such is the case, a check is made to ascertain whether or not the diversion number is found on the SG-list. If the diversion number is not found on the SG-list, activation of the VVU-service is rejected.

Between CW and CG:

A specific tone pattern, a triple tone, shall be heard when the number of the calling subscriber is present on the SG-list. If the number of the calling subscriber is not found on the list, the conventional call-wait-tone (a double tone) is heard.

Between DOB, CW and CG:

If the calling subscriber is not found on the CG-list, the same procedure is followed as that followed in the DOB-CW case, i.e. if the calling subscriber is not a colleague, then the call is immediately diverted and CW is not executed. On the other hand, if the calling subscriber is found on the CG-list, the CW-service is executed (and the triple tone is heard). If the called subscriber does not answer, the call is diverted. The interaction software is such that the called subscriber is given the opportunity of replacing his receiver and receiving a call, only when the call is from a colleague. The CW-service is executed in a normal way, and the triple tone is heard when the calling subscriber is a colleague. If the called subscriber refrains from replacing the receiver, the DOB-service is executed. This differs from the simple case of interaction between DOB and CW.

Processes

Figure 24:
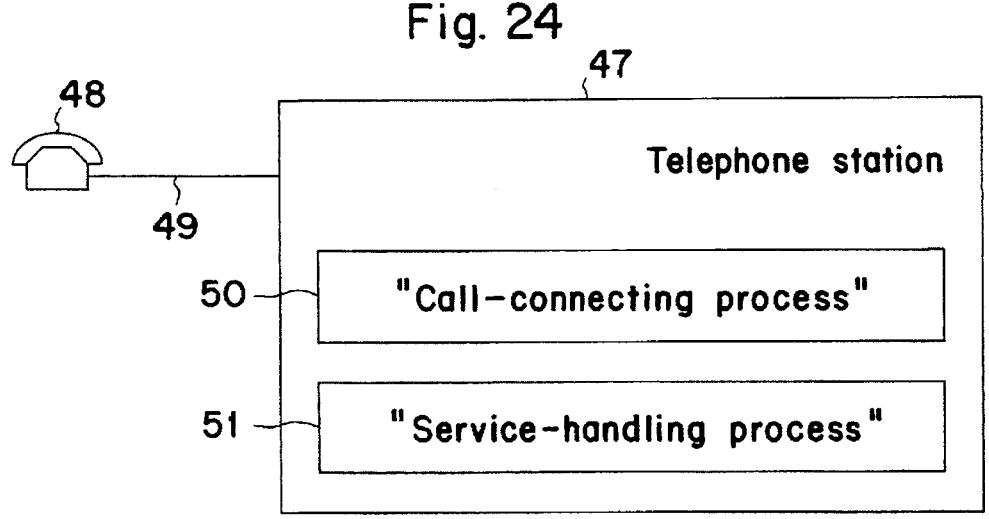
FIG. 24 illustrates schematically a telephone station in which two processes, Call Connection and Service Handling, are utilized when implementing the present invention.

FIG. 24 illustrates schematically a telephone station 47 to which a subscriber 48 is connected via a subscriber line 49. A large number of processes take place in the telephone station 47 at one and the same time. Two of these processes are of interest in respect of this example and will therefore be described in more detail. One process is concerned with the connection of calls and is shown in box 50. The other process is concerned with the management of services and is shown in box 51. Each process can be considered as a separate state machine and they can therefore be defined as separate interference capsules. The different services can now be implemented in the following way.

Implementation of the Service DOB

The service DOB has two subfunctions, of which the first subfunction is operative in executing the diversion service and the second subfunction is operative in enabling the subscriber to implement the DOB-service, i.e. to activate or to deactivate the service. The second subfunction is activated by keying-in the specific key sequence *23* for instance, and thereafter the diversion number and lastly a # sign. When the service is to be deactivated, the key sequence #23# is keyed-in. An action element aeDOB1 and aeDOB2 is defined for each respective subfunction.

Implementation of the CW-Service

The CW-service has two subfunctions, i.e. a first subfunction which executes the call waiting function, and a second subfunction which is operative in enabling the subscriber to activate and deactivate the CW-service. An action element aeCW1 and aeCW2 is defined for each respective subfunction.

Implementation of the CG-Service

The CG-service has only one function, i.e. the function of checking that the number called by the subscriber is the number of a colleague found on the CG-list. An action element aeCG is defined for this service.

Interference Analysis of the Interference Capsule "Call Connection"

All three services, DOB, CW and CG, have subfunctions which influence the call connection process. The action elements aeDOB1, aeCW1 and aeCG thus belong to the interference capsule "Call Connection", i.e. to the process 50. The binomial tree for the interference capsule has the configuration shown in FIG. 25. The nodes in the tree are potentially possible interference events. It now remains to investigate which of the nodes are actual interference events. This investigation is controlled by the specification of the services.

According to the aforedescribed specification for the services DOB and CW, interference occurs in the call-connecting process between DOB and CW, since CW shall not be executed when DOB is activated. The function which resolves this interaction, i.e. the function which bars the CW-service, is represented by an interaction element iaeX. The possible interference event is thus an actual interference event.

Figure 25:
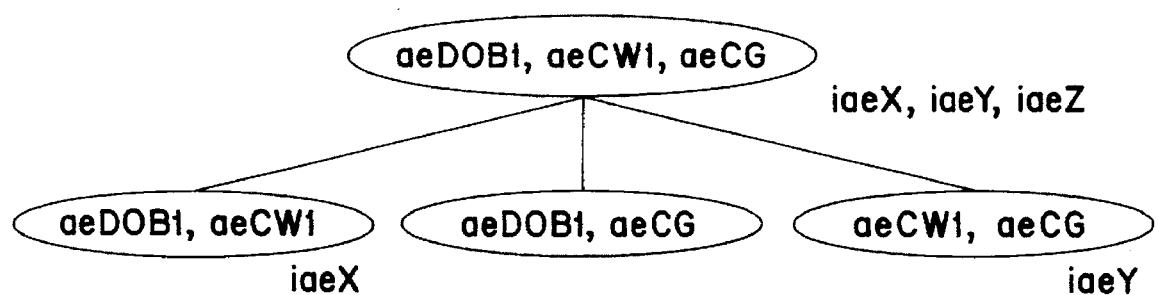
FIG. 25 illustrates a binomial tree relating to the interference capsule Call Connection in FIG. 24 and the interaction element that is obtained subsequent to analyzing the action sets in this interference capsule.

With regard to the second action set aeDOB1, aeCG in the binomial tree in FIG. 25, it is established that no additional action need be taken when these two services act simultaneously in the call connection process 50.

The DOB-service shall be implemented in the manner specified, independently of the CG-service. Conversely, the CG-service can be implemented independently of the DOB-service in the call-connecting process. No interaction elements need be defined in this regard, and the possible interference event is a free interference event.

On the other hand, in the aeCW1, aeCG case, it is specified that a special tone pattern, the triple tone, is to be generated when the subscriber has the CW-service active and the calling subscriber is present on the CG-list. The function acting in the call process and ensuring that the triple tone is generated is represented by an interaction element iaeY. This possible interference event is thus an actual interference event.

Figure 26:
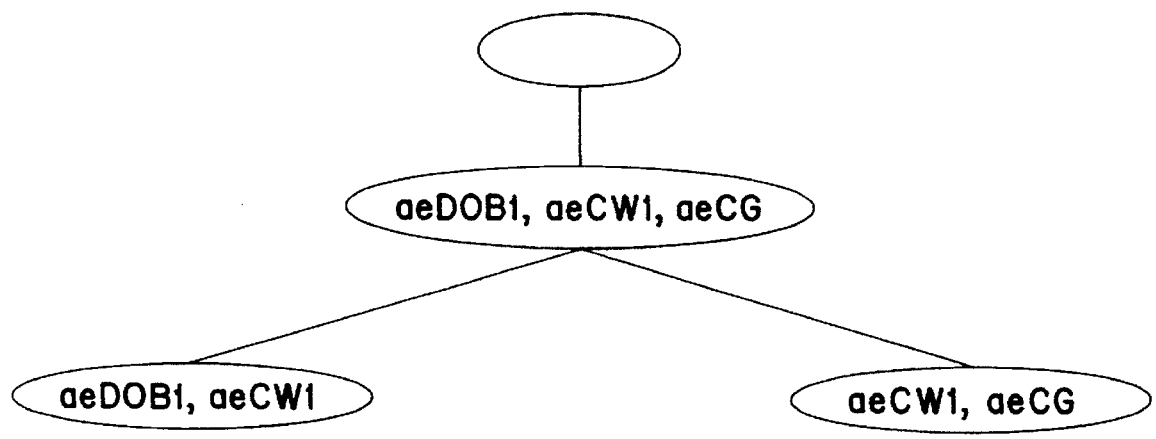
FIG. 26 refers to FIG. 25 and illustrates the supertree obtained for the interference capsule Call Connection.

It now remains to investigate the case aeDOB1, aeCW1, aeCG. The same procedures as those performed in the case aeCW1, aeCG shall also be performed in this case. The same procedures shall also be performed as those performed in the case aeDOB1, aeCW1. However, the DOB-service and the CW-service shall coact in a different way when the calling subscriber is present on the CG-list. The functions defined for aeDOB1, aeCW1 and aeCG can be reused, although this will require the addition of a new function which handles the situation that occurs when the calling subscriber is present on the CG-list. The functions which achieve this are referenced in FIG. 25 with the interaction elements iaeX, iaeY, iaeZ. This possible interference case is therewith an actual interference case according to expression (2). Thus, there is obtained for the interference capsule "Call Connection" a supertree having the configuration shown in FIG. 26.

Interference Analysis for the Interference Capsule "Service Handling"

Figure 27:
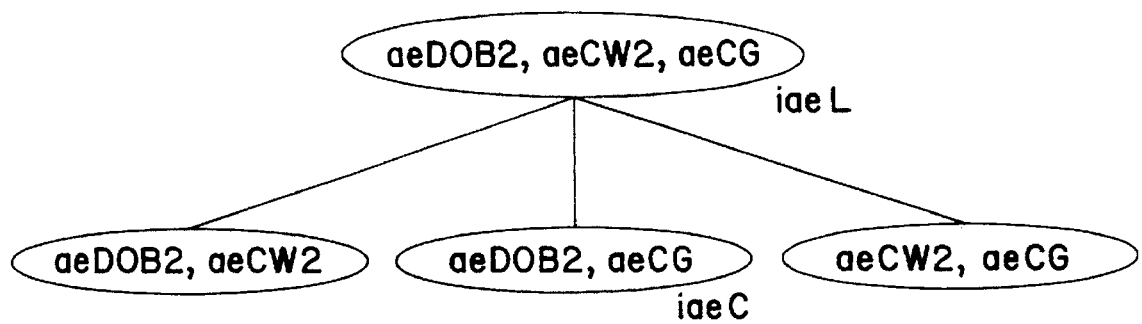
FIG. 27 illustrates a binomial tree relating to the service-handling process in FIG. 24 and the interaction element that is obtained after analyzing the action sets in this interference capsule.

Of the three services investigated, the services DOB and CW have the action elements aeDOB2 and aeCW2 which influence the service-handling process 51 in FIG. 24. The service SG has no function in the service-handling process. On the other hand, the specification of the services requires the CG-service to have an influence on the service-handling process in conjunction with activation of the DOB-service. This means that the service CG shall have an action element aeCG defined in the interference capsule for the service-handling process. The binomial tree then obtains the configuration shown in FIG. 27.

It now remains to ascertain which of these theoretically possible interference events is or are in reality an actual interference event. According to the specification for the services DOB and CW, it can be ascertained that no further action need be taken when these two services are active in the service-handling process at the same time. These two services can thus be activated and deactivated quite independently of each other. It is therewith not necessary to define an interaction element. This possible interference event is therewith a free interference event.

In the case aeDOB2, aeCG, it is necessary in accordance with the specification to check whether or not the diversion number given when activating the service DOB is found on the CG-list. The function that performs this check in the service-handling process is represented by an interaction element iaeC. This possible interference event is therewith an actual interference event.

In the case aeCW2, aeCG, it is ascertained that nothing need be done when these two services are active in the service-handling process 51 at the same time. There is thus no need to define an interaction element for this possible interference event. This possible interference event is therewith a free interference event.

It now remains to investigate the possible interference event aeDOB2, aeCW2, aeCG. Before a call is diverted, it is necessary to check whether or not the diversion number is present on the CG-list. This is precisely what must be done by the interaction element iaeC belonging to the interference event having the action set {aeDOB2, aeCG}. The function which does this for the possible interference event having the action set {aeDOBU1, aeCW2, aeCG} is the same and is represented by the interaction element iaeS. The expression (2) has therefore not been satisfied and the possible interference event is a free interference event.

Figure 28:
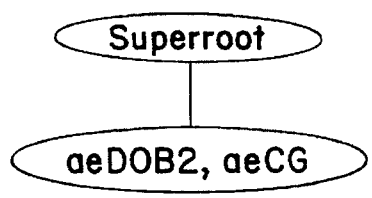
FIG. 28 relates to FIG. 27 and illustrates the supertree obtained for the interference capsule Service Handling.

The supertree for the interference capsule "Service managing" has the configuration shown in FIG. 28.

Operation During Execution

Figure 29:
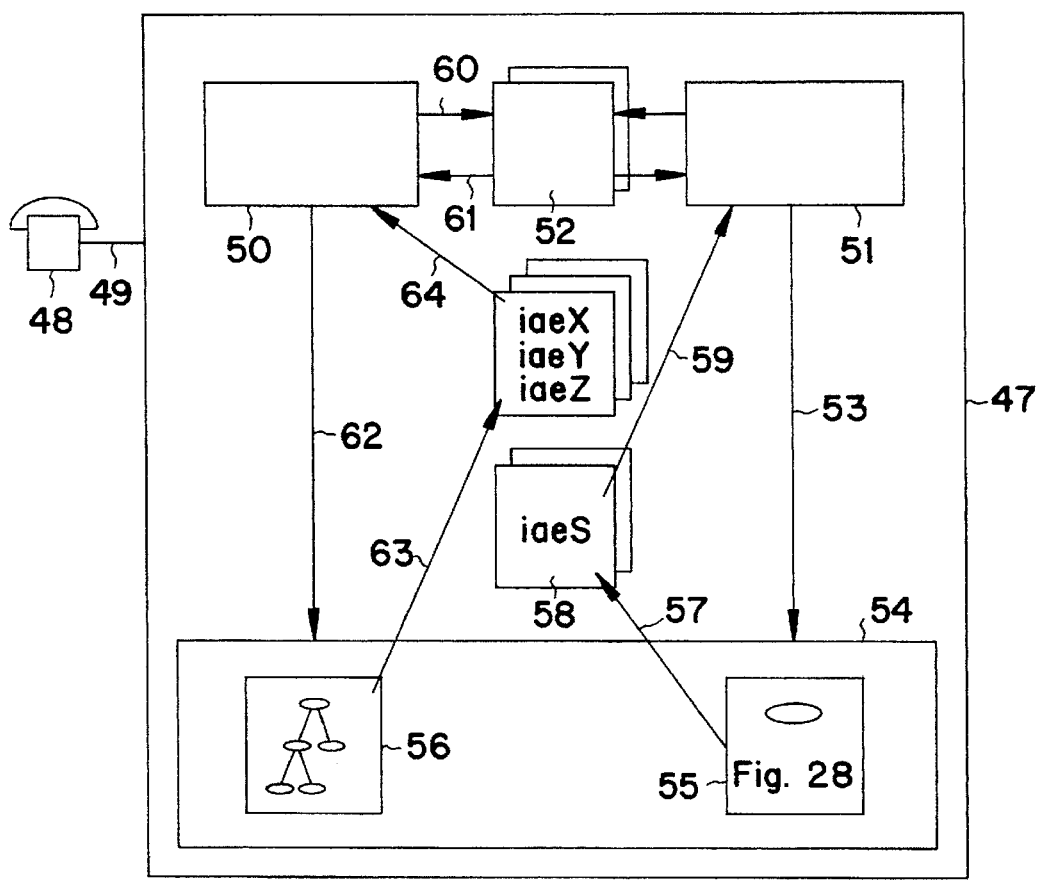
FIG. 29 illustrates the telephone station shown in FIG. 26 supplemented with the software that has been structured in accordance with the present invention.

FIG. 29 illustrates a telephone station 47 to which a telephone 48 of a user, called A, is connected by a subscriber line 49.

Activation of services:

The user A cannot handle the service CG. On the other hand, the user can handle the DOB and CW services.

The user A now wishes to activate the service DOB and to divert calls to the new telephone number 12345. The subscriber therefore keys-in the key sequence *23*12345#. Signals corresponding to the key sequence keyed-in by the user pass to the telephone station 47, where, subsequent to digit analysis, the signals are identified as an attempt to activate the service DOB. The service-handling process 51 which is intended to deal with the activation of precisely this service is now started up in the telephone station 47. The service-handling process 41 looks into the subscriber data 52 for the user A, to check the services which the user has already activated. Subscriber data is register data which contains information relating to the identity of the user, the user's telephone number, those services which the user is permitted to use, etc. When a service is activated, a flag identifying this service is inserted in the subscriber data. Consequently, the subscriber data will include, among other things, that the user A has activated the service CG and that the subfunction (DOB2) which states that the user A is allowed to use the DOB-service is also active. The subscriber data also discloses that the user A has the subfunction CW2 active, which indicates that the user A may also handle the CW-service. The investigation into the subscriber data 52 thus shows that the user A has the subfunctions CG, DOB2 and CW2 active. This result is sent as input data, marked by the arrow 53, to an analyzing unit 54 which contains an implementation 55 of the supertree in FIG. 28 and an implementation 56 of the supertree in FIG. 26. The analyzing unit 54 searches the nodes in the supertree 55 with the intention of finding a node which matches the input data. In the illustrated case, the analyzing unit finds an interference event (aeDOB2, aeCW) which is a subset of the input data. This subset has a pointer, symbolized by the arrow 57, which points to the subset corresponding to the interaction element 58, in this case iaeC. The manner in which this interaction element is implemented forms no part of the present invention. However, it is important that the interaction software of this interaction element is added to the basic software of the service-handling process 51. The arrow 59 represents the addition of the interaction software of the interaction element iaeC to the basic software of the service-handling process. If the user A had had no service active, the service-handling process 51 would not have found a matching interference event in its supertree 55 and no interaction software 58 would have been added to the basic software.

The user A now has the services DOB and CG active. The user A now wishes to make a call and dials a number, for instance 56789. A number analysis in the telephone station 47 indicates that the call-connecting process 50 shall be activated. The call-connecting process investigates the subscriber data 52 of the subscriber A, represented by the arrow 60, and finds that the subscriber A has the subfunctions DOB1, DOB2, CW2, CG active. This is represented by the arrow 61. This result is sent to the analyzing unit 54 as input data, represented by the arrow 62, and the analyzing unit calls the supertree 56, FIG. 26, of the call process to ascertain whether or not the tree contains a node which matches the given combination (aeDOB1, aeDOB2, aeCW2, aeCG) given by the input data. No interference event which matches the combination is found and no interaction software is added to the basic software of the call-connecting process.

The user A now also wishes to activate the service SV. He therefor dials the key sequence *43#. The service-handling process 51 deals with this command. It is evident from the subscriber data 52 of user A that the subfunctions DOB1, DOB2, CW2 and CG are already active. The service-handling process 51 now sends the following input data to the analyzing unit 54: aeDOB1, aeDOB2, aeCW2, aeCG. The analyzing unit 54 searches the supertree 55 corresponding to the service-handling process 51 and finds therein an interference event (aeDOB2, aeCG) which constitutes a subset of the input data. Corresponding interaction software iaeC, which checks that the correct diversion number has been fed in, is added to the basic software of the service-handling process 51, as marked by the arrow 59.

In this case, however, this interaction software iaeC is not relevant, since those program steps which handle this case are never executed. This is so because the USER A only wishes to activate the CW-service.

At this stage, the subscriber has the subfunctions DOB1, DOB2, CW1, CW2 and CG. If the A now wishes to make a telephone call and, for instance, dials the telephone number 56789, these digits will enter the telephone station 47 as input signals which, subsequent to number analysis, indicate that the call-connecting process 50 shall be started up. The call-connecting process 50 collects the subscriber data of user A, in this case DOB1, DOB2, CW1, SCW, CG, which is sent as input data to the supertree 56 of the call-connecting process. aeDOB1, aeDOB2, aeCW1, aeCW2, CG are therewith sent as input data. This transmission of the input data is represented by the arrow 62 in FIG. 29. Three interference events are matched with the input data in the supertree, namely (aeDOB1, aeCW1, aeeCG), (aeDOB1, aeCW1) and (aeCW1, aeCG). Since the last two combinations are each subsets of the first combination, only the interaction element of the first subset is called, as indicated by the arrow 63. In this case, it is the interaction set (iaeX, iaeY, iaeZ) that is added to the call connecting process, as represented by the arrow 64. However, the interaction set pointed out by the arrow 63 is not executed when the user A calls, because neither DOB nor CW are executed until someone else tries to call the user A when the user A is occupied.

Assume now that the user A is occupied and that another user tries to call user A. A new call-connecting process 50 is initiated in the telephone station and a check is made to ascertain which subfunctions the user A has active. Subscriber data announces that DOB1, DOB2, CW1, CW2 and CG are active and this announcement is fed to the analyzing unit 54 as input data. The interaction software (iaeZ, iaeY, iaeZ) will now be added to the basic software of the call-connecting process for the new call, as illustrated symbolically by the arrow 64. If the calling user is listed in the CG-list, the user A will hear the triple tone. When the user A hears the triple tone, he has the possibility of terminating the call in progress and taking-up the new call. If the user A hears the triple tone but refrains from replacing the receiver, the call is diverted.

The manner in which the supertree is implemented forms no part of the present invention. One conceivable implementation of a supertree is to write a code in the language C++. Different types of linear or two-dimensional arrays are also conceivable.

Those functions which resolve the interaction may be written in some suitable program language, e.g. C++. As the person skilled in this art will be aware, other implementations are also conceivable.

I claim:

1. A method of avoiding undesirable interference between services in a telecommunications system that includes basic software for a basic service and supplemental software for services supplemental to the basic service, wherein the supplemental software is divided into action software which act only on the basic service and interaction software which acts on the remainder of the supplemental software, said method comprising the process steps of dividing the basic service into processes; and starting a process with input signals which identify supplemental services or subfunctions of supplemental services, hereinafter referred to commonly as supplemental services, whose supplemental software shall be executed together with the basic software of the basic service in the process, wherein a supplemental service is represented by action elements;

nodes in a mathematical binomial tree are represented by combinations of action elements;

those action element combinations which correspond to interference between supplemental services form one or a number of structures in the mathematical binomial tree, said structures being referred to as interference event trees;

those supplemental services that are represented by action elements, which is indicated by the input signals to the specific process, are compared with nodes in the interference event trees belonging to the process with the intention of establishing possible agreement between current sets of action elements (the input combination) and sets of action elements which belong to nodes in the interference event trees for the process;

only those nodes in the interference event trees whose sets of action elements are equivalent with the current set of action elements or a subset of the current subset of action elements are selected;

those nodes in the interference event trees whose sets of action elements are subsets of the action elements of another selected node are not selected; and interaction software which resolves interferences corresponding to the node or nodes chosen in the interference event trees is added to the basic software that executes the process.

2. A method according to claim 1, wherein a set A of action elements which requires that a set Q of interactions shall be executed, the set A is defined as belonging to a new interference event when all direct subsets $B_j$ {j=1, 2 ... t} of A belong to interference events whose interaction sets $R_j$ are configured so that $$Q \neq \bigcup_{j=1}^{j=t} R_j$$

3. A method according to claim 2, wherein a new interference event is defined to exist when the following relationship is satisfied:

$$R \cap R_n \neq 0, \text{ där } m, n \in j \text{ och } m \neq n.$$

4. A method according to claim 2, wherein the tree structure of an interference event tree is determined by links between nodes;

if the set A of action elements of an interference event is a direct subset of the set B of action elements of another interference event, there does not exist an interference event whose set C of action elements is a subset of the set B when the set A is a subset of the set C; and as a result of said linking process, there is finally obtained a set which is not a subset of any other set and which is referred to as the root of the interference event tree.

5. A method according to claim 4, comprising the following steps (a) starting an investigation of the current combinations of input signals to nodes in the supertree at each interference event root;

(b) interrupting the investigation of underlying nodes when a node is found to be active; and (c) continuing the investigation of underlying nodes when a node is found to be non-active.

6. A method according to claim 5, wherein a node is defined as being active when its set of action elements is the same as the current input signal combination or a subset of the current input signal combination.

7. A method according to claim 6, wherein a node is defined as lying beneath the investigated node when its set of action elements is a subset of the set of action elements of the investigated node, and wherein the underlying node belongs to the same interference event tree and the same branches of said tree as the investigated node.

8. A method according to claim 7, said node having a given combination of input signals may be present in several different interference event trees belonging to the same process, said method further comprising the steps of assigning nodes having said given combination with two attributes, of which the first attribute is static and denotes the number of times a node having the given combination occurs in different supertrees, and of which the other attribute is dynamic and is stepped-up by one unit each time the investigation shows a match between the current combination of input signals and the combination of action elements of the given node;

adding the interaction software which resolves the conflict between the supplemental services of the given node to the basic software only when the two attributes are equal; and setting the dynamic attributes to zero upon termination of the investigation of the supertree.

9. A method according to claim 8, comprising the steps of placing a flag in the subscriber data of the user for each supplemental service activated by said user; and reading the flags placed in the subscriber data for each process that concerns the subscriber process and forming input signals that correspond thereto.

10. A method of producing an interference event tree for a process in a telecommunications system which includes basic software for a basic service and supplemental software for services that are supplemental to the basic service, said supplemental software being divided into action software which acts solely on the basic service and interaction software which acts on the remaining supplemental software, said method further comprising the steps of specifying supplemental services and the desired functions of said supplemental services;

specifying, for combination of supplemental services interference resolving supplemental services, hereinafter called interaction services, and their desired functions;

constructing a binomial tree covering all possible combinations of action elements that represent a supplemental service or a subfunction of a supplemental service, hereinafter referred to commonly as a supplemental service;

determining which combinations give rise to interference on the basis of the specifications of combinations of action elements; and linking together those combinations whose action elements give rise to interference with the aid of the direct subset relationship, therewith obtaining one or more interference event trees.

11. A method according to claim 10, further comprising the step of linking the roots of the interference event trees together in a super root so as to form a supertree.

12. A method of structuring interference events between supplemental services in a telecommunications system that includes basic software for a basic service and supplemental software for services supplemental to the basic service, said supplemental software being divided into action software which acts solely on the basic service and interaction software which acts towards the remaining supplemental software, said method comprising the steps of for each process performing the step of recording each specific combination of all available supplemental services, called action elements, which may be either active or passive, wherein the action elements in each specific combination together form a set of action elements;

for each set of action elements of said process the step of recording all functions, called interaction elements, that resolve interaction and which must be executed because two or more action elements in the specific action set are activated at the same time, said interaction elements being active or passive and together forming an interaction set which belongs to the specific action set; said specific action set and associated specific interaction set together forming an interference event, which may be active or passive.

13. A method according to claim 12, comprising the step of activating an interference event when all action elements in the set of action elements in said interference event are activated and the action set of said interference event is not a subset of the action set of some other active interference event.

* * * * *